(12) United States Patent
Kisiler

(10) Patent No.: US 11,809,466 B1
(45) Date of Patent: Nov. 7, 2023

(54) APPARATUSES AND METHODS FOR LAWNCARE ASSESSMENT AT A LOCATION

(71) Applicant: Honda Motor Co., Ltd., Tokyo (JP)

(72) Inventor: Mark Kisiler, Torrance, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/882,926

(22) Filed: Aug. 8, 2022

(51) Int. Cl.
*G06F 7/00* (2006.01)
*G06F 16/29* (2019.01)
*G06Q 50/02* (2012.01)

(52) U.S. Cl.
CPC .............. *G06F 16/29* (2019.01); *G06Q 50/02* (2013.01)

(58) Field of Classification Search
CPC ..... G06F 16/29; G06F 16/9537; G06Q 50/02; G06Q 50/165
USPC .......................... 707/770, 736, 792, 999.003
See application file for complete search history.

(56) References Cited

U.S. PATENT DOCUMENTS

| | | | |
|---|---|---|---|
| 9,779,442 B1 | 10/2017 | Cimic et al. | |
| 10,614,503 B2 | 4/2020 | High et al. | |
| 11,134,616 B2 | 10/2021 | Davis et al. | |
| 11,488,077 B1* | 11/2022 | Lyman | H04L 12/2825 |
| 2016/0350691 A1* | 12/2016 | Davis | G06Q 50/10 |
| 2022/0342989 A1* | 10/2022 | Bunker | G06V 20/52 |
| 2022/0405870 A1* | 12/2022 | Conway | G06V 20/13 |

FOREIGN PATENT DOCUMENTS

| | | |
|---|---|---|
| CN | 107318494 A | 11/2017 |
| CN | 108241333 A | 7/2018 |
| CN | 108684278 A | 10/2018 |
| CN | 108684278 B | 7/2020 |
| CN | 111448974 A | 7/2020 |
| FR | 2940882 B1 | 4/2013 |

(Continued)

*Primary Examiner* — Md I Uddin
(74) *Attorney, Agent, or Firm* — KENEALY VAIDYA LLP

(57) ABSTRACT

Systems and methods are provided to assess lawncare at an area. The system can include a computer processor (CP) and a database. The processing can include accessing task data regarding a task to be applied to the area; accessing profile data associated with the area; mapping, based on the task data, to first data regarding a first candidate option to be considered for performance of the task, the first data including DIY (do-it-yourself) related data, regarding the user performing the task; mapping, based on the task data, to second data regarding a second candidate option to be considered for performance of the task, the second data including service provider (SP) related data, regarding an external party performing the task; generating a first option score, for the first candidate option, based on the profile data and the first data; generating a second option score, for the second candidate option, based on the profile data and the second data; performing score processing, including processing the first option score and the second option score, and the performing score processing including determining that the first option score is favored over the second option score; and saving in the database, based on the determining, recommendation data that the first candidate option is preferred.

18 Claims, 21 Drawing Sheets

(56) References Cited

FOREIGN PATENT DOCUMENTS

| | | | |
|---|---|---|---|
| IN | 201641016250 | A | 5/2016 |
| IN | 202141038799 | A | 10/2021 |
| RU | 2538997 | C2 | 1/2015 |
| WO | 2017029592 | A1 | 2/2017 |
| WO | WO2021216655 | A1 | 10/2021 |

\* cited by examiner

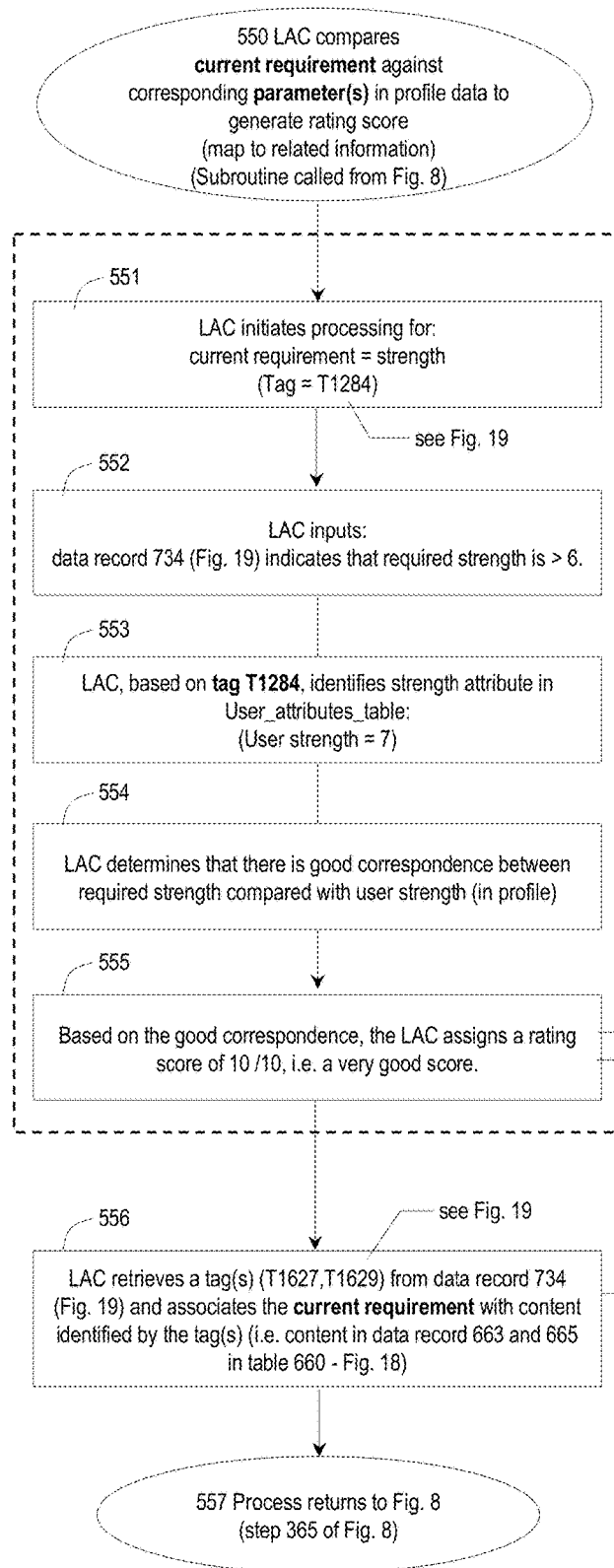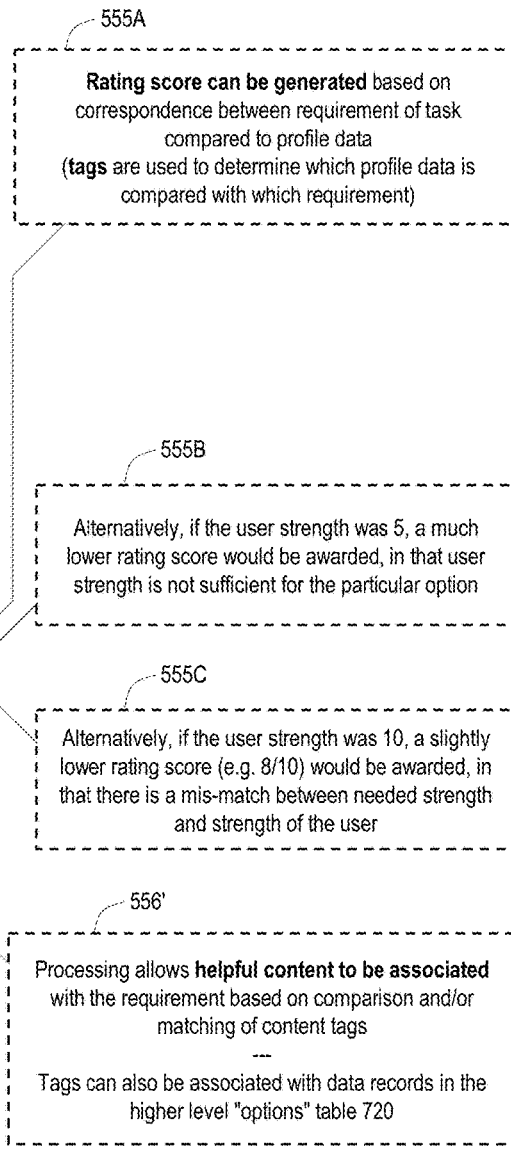
Fig. 12

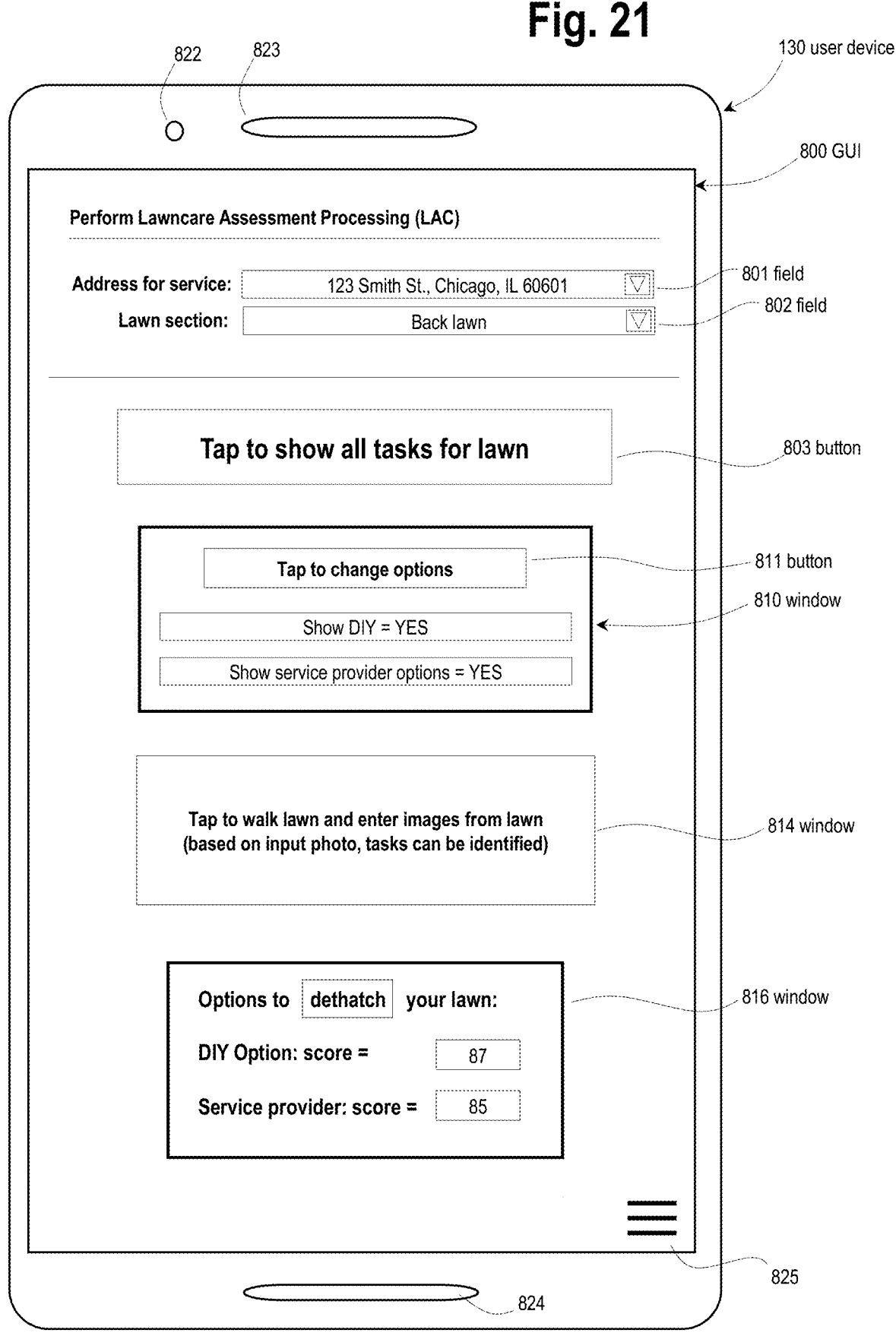

APPARATUSES AND METHODS FOR LAWNCARE ASSESSMENT AT A LOCATION

BACKGROUND

The disclosed subject matter relates to methods and apparatuses that assess the condition of a geographical area and provide options to address such conditions. More particularly, the disclosed subject matter relates to methods and apparatuses that assess conditions on a lawn or turf, or other area, generate options to address such conditions, and related processing.

Manual tools, manually operated machines, powered tools and powered machines can be used to create and maintain a landscape for a residential property or a commercial property. The manual tools and machines can be referred to collectively as manual equipment and include, but are not limited to, a rake, a shovel, a hoe, an aerator, pruning shears, a pruning saw, and a lawnmower. The powered tools and powered machines can be driven by an internal combustion engine or an electric motor or a hybrid of an internal combustion engine and an electric motor. The powered tools and machines can be referred to collectively as powered equipment or power equipment and include, but are not limited to, a string trimmer, a hedge trimmer, a power saw, a lawnmower, a tiller, a snowblower, and a garden tractor.

Residential property owners, property managers and commercial property owners can manage the care of the lawn and other vegetation forming the landscape of the property on their own or through a professional landscape service or both. Do-it-yourself ("DIY") lawncare can require the property owner/manager to invest in the purchase of any number of manual equipment and/or powered equipment as well as landscape care ingredients such as chemicals, fertilizers, soil, vegetation, and the like. DIY lawncare can also require a substantial amount of time to perform the various tasks/duties required to achieve the desired aesthetics for the landscape of the property. Further, DIY lawncare can require the property owner/manager to perform repairs and preventative maintenance on the manual equipment and/or the powered equipment. The property owner/manager can perceive the repair and maintenance as an inconvenience or an undesirable obstacle for maintaining the desired aesthetics of the landscape.

As an alternative to DIY lawncare, a property owner/manager can employ the services of a professional landscaper to maintain the health and appearance of vegetation on the property at the desired level of aesthetics. A professional landscape service can have access to a wide variety of manual equipment and powered equipment that can permit the professional landscaper to execute the desired lawncare treatment more effectively and/or efficiently than the property owner/manager. However, the cost of the professional landscape services can outweigh the convenience to the property owner/manager.

SUMMARY

In accordance with an aspect of the disclosed subject matter, a system to assess lawncare conditions for an area at a geographical location can be provided, the system including a tangibly embodied computer processor (CP) and a tangibly embodied database, the CP implementing instructions on a non-transitory computer medium disposed in the database, and the database in communication with the CP, the system can include: a communication portion for providing communication between the CP and a user device; the database that includes the non-transitory computer medium, and the database including the instructions; and the CP, and the CP performing processing including: accessing task data regarding a task to be applied to the area; accessing profile data associated with the area; mapping, based on the task data, to first data regarding a first candidate option to be considered for performance of the task, the first data including DIY (do-it-yourself) related data, regarding the user performing the task; mapping, based on the task data, to second data regarding a second candidate option to be considered for performance of the task, the second data including service provider (SP) related data, regarding an external party performing the task; generating a first option score, for the first candidate option, based on the profile data and the first data; generating a second option score, for the second candidate option, based on the profile data and the second data; performing score processing, including processing the first option score and the second option score, and the performing score processing including determining that the first option score is favored over the second option score; and saving in the database, based on the determining, recommendation data that the first candidate option is preferred.

In accordance with another aspect of the disclosed subject matter, a user device hosting an installed system to assess lawncare conditions for an area at a geographical location can be provided, the system including a tangibly embodied computer processor (CP) and a tangibly embodied database, the CP implementing instructions on a non-transitory computer medium disposed in the database, and the database in communication with the CP, the user device can include: a communication portion for providing communication between the CP and external processors; the database that includes the non-transitory computer medium, and the database including the instructions; and the CP, and the CP performing processing including: accessing task data regarding a task to be applied to the area; accessing profile data associated with the area; mapping, based on the task data, to first data regarding a first candidate option to be considered for performance of the task, the first data including do-it-yourself (DIY) related data, regarding the user performing the task; mapping, based on the task data, to second data regarding a second candidate option to be considered for performance of the task, the second data including service provider (SP) related data, regarding an external party performing the task; generating a first option score, for the first candidate option, based on the profile data and the first data; generating a second option score, for the second candidate option, based on the profile data and the second data; performing score processing, including processing the first option score and the second option score, and the performing score processing including determining that the first option score is favored over the second option score; and saving in the database, based on the determining, recommendation data that the first candidate option is preferred.

In accordance with another aspect of the disclosed subject matter, a method to assess lawncare conditions for an area at a geographical location can be provided, implemented on a system including a tangibly embodied computer processor (CP) and a tangibly embodied database, the CP implementing instructions on a non-transitory computer medium disposed in the database, and the database in communication with the CP, the method including: inputting profile data related to a landscape at the area from at least one of a camera, a radar sensor, and a Lidar sensor; accessing task data regarding a task to be applied to the area; mapping, based on the task data, to first data regarding a first candidate option to be considered for performance of the task, the first data including DIY (do-it-yourself) related data, regarding the user performing the task; mapping, based on the task data, to second data regarding a second candidate option to be considered for performance of the task, the second data including service provider (SP) related data, regarding an external party performing the task; providing information to a user via a user device, the information including at least a set of DIY related information and a set of SP related information, the DIY related information including at least one of DIY cost, DIY product recommendation, DIY ingredient recommendation, and DIY environmental impact information, and the SP related information including at least one of SP cost, SP product recommendation, SP ingredient recommendation, and SP environmental impact information.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 12 is a flowchart showing details of "LAC compares current requirement against corresponding parameter(s) in profile data to generate a rating score" of a subroutine, in accordance with principles of the disclosed subject matter.

FIG. 21 is a schematic diagram of a user device with Graphical User Interface (GUI), in accordance with principles of the disclosed subject matter.

DETAILED DESCRIPTION OF EXEMPLARY EMBODIMENTS

Figure 1:
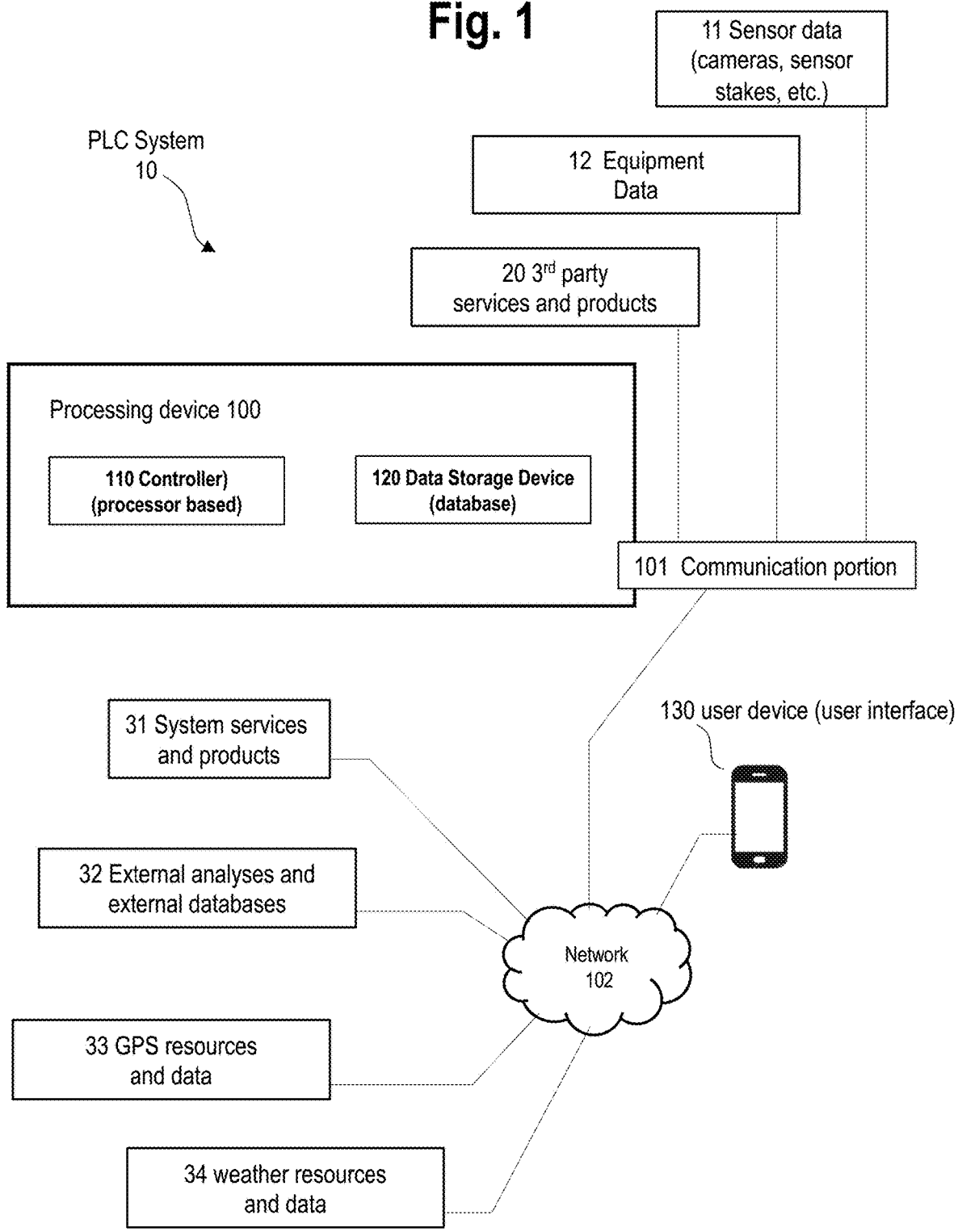
FIG. 1 is a schematic view of a prescriptive lawncare system made in accordance with principles of the disclosed subject matter.

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

The disclosed subject matter relates to a prescriptive lawncare system ("PLC system") 10 for analyzing landscape needs that includes a sensor 822 for taking a video or other scan of a current landscape such as a lawn, grass line, turf composition, tree line, etc. The system 10 can include a user device 130 that provides a list of what needs to be done and rate difficulty on a scale from DIY to professional. In addition to routine cutting, trimming, and pruning of the vegetation that forms a property landscape, other maintenance of the landscape can include but is not limited to watering, chemical treatment, seeding, aeration, fertilizing, sodding, grading, soil improvements, and dethatching.

The sensor 822 can be incorporated physically in the user device 130 (such as cell phone, tablet, or other user interface device). Alternatively, the sensor 822 can stand alone and communicate with the user device 130. For example, the sensor 822 can be configured as a standalone camera, a Lidar sensor, a radar sensor, or other scanning equipment that can be connected either wirelessly or via wire to the user device 130. Alternatively, the sensor can be a global positioning system sensor such as a GNSS/GPS sensor, an inertial measurement unit sensor (IMU sensor). The sensor 822 can be used to provide position information that is cross referenced with the other data or used to generate a map of the area. In addition, the sensor 822 can include a moisture sensor or nutrient sensor configured to provide data that is included with positional, mapping or scan data that allows the user device to determine locations on the lawn that require different or additional nutrient or moisture application. Thus, the sensor 822 can include an array of sensors that provide the user device 130 with multiple forms of data for processing. The sensor 822 can be mounted on or incorporated into a lawncare machine 827 such as a tractor, lawnmower, snow removal machine, drone or unmanned aerial vehicle (UAV), or other vehicle that traverses a target property or landscape. The sensor 822 can also be mounted on or incorporated into a lawncare tool 828 such as a string trimmer, edger, saw, cutter, or other garden or lawn and turf care tool.

Once the target property or landscape has been scanned or imaged by the sensor 822, the system 10 can be configured to provide a list of tasks via the user device 130 to a user. The list of tasks can be sorted into categories, such as a "do-it-yourself" (DIY) category, a mixed category that includes a mix of DIY and professional tasks, and a professional service provider category, and gradients between these categories. Each task can be provided a category and listed up on the user device 130 for review by the user. For example, cutting the yard may fall into the DIY category and include recommending equipment (for rental or purchase) for achieving this task by the user. Grading the yard may fall into the professional category and include recommending equipment (for rental or purchase) as well as recommending professionals in the area that may be suited for the particular task. Fertilizing can fall into a mixed category task and include: recommending fertilizer materials (for purchase, delivery, subscription, or application); recommending tools and machines (for rental or purchase) for application of fertilizer; as well as recommending professional suppliers or providers of fertilizer services. Thus, if a homeowner or property manager wants to do a task him/herself, the system 10 can provide recommendations for tools and machines and ingredients/materials along with pricing and various rental, subscription, and/or purchase options, and could include a barter or borrow option for obtaining tools from other users if the system 10 is networked to other users. Support can also be requested via the system 10 and provided by a neighbor, an online coach, a professional in the subject area, or other. For tasks that are hired out, a list of lawncare providers can be provided via the user device 130. The system 10 can also be configured to provide a comparison chart that includes time spent, cost, as well as other variable to consider when determining whether to move forward under the DIY option or other option on the scale up to professional services option.

The system 10 can be incorporated into an application or "app" that can be downloaded or otherwise installed onto a cell phone, tablet, or other computing device. In one embodiment, the system 10 can categorize a user and/or tasks into three groups: DIY (user does all tasks), mixed DIY and professional, and professional (where a third party does all of the listed tasks in the app). As indicated above, each task can be listed under a category and recommendations can be made and cost/benefit charts can be compiled for recommendation to a user through the user device 130.

When a task is determined to be intended for a professional (based on a weighting of the type of user and the type of task), the system 10 can recommend professionals. The professionals who are recommended can vary depending on weighted factors placed into the system, including, for example, whether a professional uses a certain type or brand of equipment and/or ingredients, whether a professional subscribes to a service related to the system 10, as well as other factors.

The system 10 can provide a user comparative pricing for equipment, lawncare ingredients, and professional services. The system 10 can also be configured to compare various options for treating the target location based on cost and available services. Further, the system 10 can be networked with various equipment providers, ingredient suppliers, and professional lawncare service providers to provide for competitive bidding options that can be presented via the user device 130 to a user for hiring out or purchasing goods and services related to the lawncare assessment by the system 10.

Data regarding the target landscape can be obtained in various manners and via different types of sensor 822. For example, a combination of camera and satellite data can be used to compile a lawncare assessment in order to recommend related goods and services. The scanning of the target landscape can be accomplished through sensor(s) 822 owned or used by a user of the system 10. Alternatively, a third party can scan the target property and provide the scan data to the user of system 10. However, in a more straightforward approach, a user can open an app in the user device 130, show a down view of property, take images or video of the landscape by moving the camera or other sensor associated with the user device 130 about the target landscape. The system 10 can then assess what is needed or recommended for the target landscape. In one embodiment, the user device 130 can be configured to provide three categories of options (categories can be 1) DIY, 2) mixed DIY and professional service provider, and 3) professional service provider; and options can be cost, equipment type, environmental impact, ingredient type, third party provider, etc.) for selection by the user of the system 10, and the selected option can be transmitted to suppliers and vendors such that tools and services are placed into a shopping cart for a user to purchase, if desired.

The system 10 can also be configured to take into consideration the size of the landscape, geometry of the landscape, condition of the lawn or turf and soil. Based on these inputs, the system 10 can make a recommendation about the equipment that might be useful to care for the yard, including purchase and rental options. This may include recommending use of soil testing, serrating, dethatching, cutting, fertilizing, and other equipment. The system 10 can link to instruction videos for how to use the equipment, frequency of using the equipment, and maintenance of the equipment.

The system 10 can recommend and deliver a landscape treatment plan based on actual conditions in the landscape. In particular, the system 10 can consider the environmental impact factors including, for example, carbon emissions and pollution for each potential landscape treatment option. The system 10 can also consider environmental factors due to manufacturing, shipping (total shipping process from supplier to home), application of ingredient or product, and post application runoff impact. The system 10 could use a weighted consideration of these factors to recommend the least impactful treatment option and formulate and or custom blend a suitable fertilizer or ingredient, and formulate a cutting, trimming, and mechanical device operation treatment plan.

The presently disclosed subject matter also contemplate that the services provided may be automated. For example, the recommended services rendered by a service provider could be either manual (traditional method) or automated. This distinction could be weighted in the scoring built into the software and/or hardware of the app depending on customer preference. If the services are automated, the system 10 can include an automated irrigation system, and automated lawnmower, and automated planter/seeder, or other robotic or automated machinery that can be called upon at a desired timing to conduct services when signaled by the system 10. For example, a user device 130 can include hardware or software that is tied or linked to each of the different automated systems associated with the desired services such that a reminder may appear on the user device 130 when timing of a service is optimum, so that the user can OK the service. Of course, the services can automatically initiate if the service is pre-authorized or programmed into the system 10.

The hardware and/or software of the system 10 can include steps of mapping, based on the task data, to automation data regarding an automation option to be considered for performance of the task. The automation data can include information relating to automated tasks and manual tasks, such as whether a robot or automated irrigation device or automated lawnmower is more suitable for a task or whether a service provider should initiate manual operations or a personal visit to take care of the task, for example, when a non-automatable condition exists such as a downing of a tree, home damage exists, or other task that is not suitable for available automated service options exists. The hardware and/or software can include a step of generating an automation option score based on the automation data and a second data (map information, moisture information, vegetation state information, etc.). A performing score processing can process the automation option score and weight it against other scores to determine whether automation of a task is preferred, and then allow initiation of either an automated task or a manual task, as recommended or desired by either the user or by the automatic protocols included in the system 10.

As indicated above, a property owner/manager can completely lack experience in basic lawncare or have very limited experience with lawncare. Further, a property owner/manager can completely lack or have only a basic understanding for diagnosing the health of the property's landscape and/or how to effect treatment of the landscape to improve or maintain the health of the landscape. Thus, there is a need for a prescriptive lawncare service that can help a property owner/manager to diagnose the current health of the property's landscape, maintain the health, modify the landscape to improve appearance and/or achieve the desired aesthetics, and perform the routine maintenance such as but not limited to cutting of the lawn.

FIG. 1 is a schematic illustration of a prescriptive lawncare system ("PLC system") 10 that can provide property owners/managers and professional landscapers with information about a relevant landscape, formulate a treatment plan for the landscape, recommend service(s) and equipment for executing the treatment plan, and/or provide instructions for executing the treatment plan. The PLC system 10 can include data processing device or system 100 (hereinafter "processing device 100"), sensor data 11, equipment data 12, and other processing and/or data resources. The PLC system 10 can include third party services and systems 20 that can include external services and systems. The PLC system 10 can include system services and products 31, external analyses and external database resources 32, global positioning system ("GPS") and satellite resources and data 33, and weather resources and data 34.

The processing device 100 can include a communication portion 101, a processor-based controller 110, and a data storage device 120.

The communication portion 101 can be electrically connected and in communication with the various components of the PLC system 10, as shown in FIG. 1. Such electrical connection and communication can be provided over a network 102 or over some other communication mechanism or arrangement.

FIG. 1 schematically illustrates respective lines or communication lines connecting the communication portion 101 to each of the data inputs 11, 12, the providers 20, 31, 32, 33, 34, and the user interface 130. These lines can schematically represent a wired connection or a wireless connection. The electrical communication can be over a local computer network, or over the internet, or over a cellular network, or any combination these networks or over some other communication mechanism. The electrical communication can be over network 102, as shown in FIG. 1. The communication portion 101 can pass data and/or information between the controller and each of the data inputs 11, 12, the providers 20, 31, 32, 33, 34, and the user interface 130.

The sensor data 11 can include data indicative of the color and density of a lawn, the moisture content, sunlight exposure, and other attributes. The sensor data 11 can be obtained by any appropriate device(s) such as but not limited to a camera, sensor stakes, etc.

The equipment data 12 can include the type of lawncare equipment that is owned by the property owner/manager, the type lawncare equipment owned by one or more neighbors, and/or the type of lawncare equipment being used on the property or location by a professional landscape service. The equipment data can include data indicative of handheld tools, walk-behind machines, and ride-on machines. The equipment data can include attributes of the equipment including whether the equipment is manually operated, powered by an internal combustion engine, powered by an electric motor, or powered by a hybrid of an internal combustion engine and electric motor. The equipment data can include data indicative of the hours of operation, the maintenance schedule, completed maintenance, etc., for each piece of equipment.

The user interface 130 can be in the form of a user device 130. The user interface can be any appropriate electronic device, such as, but not limited to, a cellular (mobile) telephone, a tablet computer, a laptop computer, a desktop computer, a server terminal, that can permit a user to input requests for information to and receive information generated by the processing device 100.

The GPS resources and data 33 can include satellite image(s) of the property and neighboring properties, street level image(s) of the property and neighboring properties. map data of the property and neighboring properties, and address information of the property and neighboring properties. Any number of user interfaces 130 can be in electrical communication with the processing device 100.

The weather resources and data 34 can include data indicative of temperature (daily highs and lows, averages, maximums, minimums, current) precipitation amounts, amount of sunshine (average, maximums, minimums, current). The weather data 34 can be obtained from a service provider or government agency.

In general, inputs into the processing device 100 can be electrically connected to data sources such as, but not limited to, a soil sample analysis, geographic information, lawn scan and mapping data, and regulation/ordinance information. Data representing soil sample analysis can be provided by a third party or determined by the controller 110 using data output by a soil analysis apparatus in electrical communication with the controller 110, where the output data is based on a soil sample introduced to an analysis apparatus by the user. Lawn scan and mapping data can be based on data obtained from, but not limited to, a formal land survey, satellite imagery, a digital image scan of the landscape, and government agency(ies) such as the U.S. Geological Survey and U.S. Department of Agriculture. Regulation/ordinance information can be obtained from any appropriate local, regional or national government agency or from a subscription database of local, regional and national regulations and ordinances.

The processing device 100 can generate outputs, through electrical communication, to the user interface 130 and the service and/or equipment providers. The processing device 100 can output a treatment plan and/or other information requested by the user and can output requests or notifications to the service and/or equipment providers based on the treatment plan and/or other information requested by the user.

The processor-based controller ("controller") 110 can be a physically embodiment of a machine referred to as an electronic computing device such as but limited to an electronic control unit ("ECU"), a central processing unit ("CPU"), a microcontroller, a microcomputer, a server, a plurality of electronic computing devices or servers, or other appropriate processor-based controller(s) that can receive data inputs, execute commands for processing the data inputs, and output a treatment plan based on executed commands. The controller 110 can be configured with hardware alone or in combination with software to execute commands that process the data inputs and output any of a plurality of lawncare treatment plans in accordance with the disclosed subject matter. The controller 110 can be referred to as a product and service recommendation engine 110.

For example, the controller 110 can be configured to interact with the user interface 130 and permit a user to request a fertilizer plan for the landscape. The controller 110 can be configured to determine a fertilizer content and schedule based on data input by the user and data input from any appropriate data input(s). In another example, the controller 110 can be configured to permit the user to request a sunlight evaluation of the landscape based on measured sunlight data input to the controller 110 and recommend a treatment plan for the landscape based on the processed sunlight data. In yet another example, the controller 110 can be configured to permit the user to request an evaluation of the grade of the lawn and output a recommended adjustment of the grade and provide the user with instructions and recommendations on how to achieve the recommended grade. In yet another example, the controller 110 can be configured to permit the user to request a soil analysis of the landscape, recommend a treatment plan for the landscape soil, and provide a water runoff analysis after the user implements the treatment plan. In yet another example, the controller 110 can be configured to permit the user to select a desired aesthetic appearance of the landscape, recommend a treatment plan that can achieve the desired aesthetic appearance, and rank the recommended treatment plan according to predetermined parameters such as but not limited to difficulty, cost, equipment availability, and ingredient availability. The controller 110 can be in electrical communication with each of the data inputs 11, 12, the providers 20, 31, 32, 33, 34, and the user interface 130.

The data storage device 120 can be any appropriate non-transitory recording or storage medium such as, but not limited to, a CD-ROM, a DVD-ROM, a hard drive, a RAM, a ROM, a floppy disc, and a magnetic tape cassette, or later developed medium such as, but not limited to, transitory recording medium, or carrier waves. The data storage device 120 can include some or all of the software that is executed by the controller 110 in order to provide the treatment plan(s) requested by the user. The data storage device 120 can store data created by the controller 110 that is indicative of the one or more parameters of a landscape, lawn or location such as, but not limited to, grade, type(s) and location(s) of the vegetation, water-runoff analysis, scanned images, map information, soil analysis, coloration of the vegetation, chemical analysis of the vegetation. These parameters can be referred to as the digital lawn.

A provider of the PLC system 10 can be a manufacturer of lawncare equipment. The system services and products 31 can include lawncare products manufactured by the manufacturer, other service(s) offered by the manufacture and other products available from the manufacturer. The processing device 100 can communicate with the system services and products 31 to provide the user with suggested equipment, sales information, and other services/products. The sales information can include the location of a lessor, retailer or dealer of the suggested equipment. The controller 110 can be configured to send a message to the lessor, retailer or dealer indicative of the user's desire of or inquiry regarding the suggested equipment so that the lessor, retailer or dealer can initiate contact with the user about a possible sale or lease of the suggested lawncare equipment.

The manufacturer of lawncare equipment and provider of the PLC system 10 can also offer other services such as, but not limited to, professional landscaping, professional lawncare maintenance, and other products such as, but not limited to, portable generators, cars, pick-ups, sports-utility vehicle, cross-over vehicle, vans, motorcycles, all-terrain vehicle, outboard motors, and aircraft. The controller 110 can be configured to provide the user with information regarding any of the other products or offerings from the manufacture.

The external services and products 20 can be any third party entity not affiliated with the provider of the PLC system 10 such as, but not limited to, a manufacturer of fertilizer, a professional landscaper, or a rental company that leases lawncare equipment. The controller 110 can be configured to provide the user and any component of the external services and products 20 with information about each other. For example, the controller 110 can be configured to output a message to a professional landscaper that indicates that the user is interested in hiring a professional landscaper. The controller 110 can be configured to obtain information from the landscaper such as cost, services provided and equipment used and provided this information to the user via the user interface or user device 130. For example, the landscaper can have traditional lawncare equipment that is operated by a designated person, or automated lawncare equipment that is operated remotely or fully autonomous.

Figure 2:
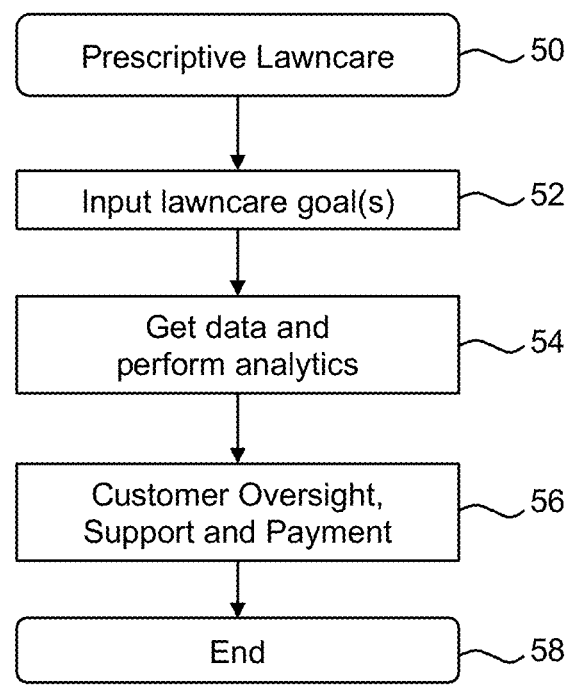
FIG. 2 is flowchart that outlines the general operation of the prescriptive lawncare treatment system of FIG. 1 in accordance with principles of the disclosed subject matter.

FIG. 2 is flowchart illustrating the general operation of the controller 110. At step 50, the user can initiate a prescriptive lawncare service session with the controller 110 via the user interface 130. The processing performed by the controller 110 can then move to step 52.

At step 52, the controller 110 can be configured to prompt the user to input one or more lawncare goals for the property or location. The controller 110 can be configured to move to step 54 when the user has entered desired goals to the controller 110 via the user interface 130.

At step 54, the controller 110 can be configured to access all of the data inputs 11, 12, the providers 20, 31, 32, 33, 34, and the user interface 130, that are appropriate to generate a treatment plan in accordance with the user's goal(s). After obtaining the data, the controller 110 can be configured to analyze the obtained data in accordance with predetermined processing, computations and comparisons. After completing the analysis, the controller 110 can move to step 56.

At step 56, the controller 110 can be configured to generate and output a treatment plan based on the analysis performed in step 54. The controller 110 can be configured to prompt the user to request or decline supplemental information regarding the treatment plan. The supplemental information can include information from the system services and products 30, information from the external services and products 40, instructions on how to execute the treatment plan, frequently asked questions ("FAQs") related to the treatment plan, etc. At step 56, the controller 110 can be configured to accept payment from the user for the treatment plan and for any services and products ordered for the execution of the treatment plan.

After completing the payment(s), the controller 110 can be configured to end the prescriptive lawncare service session.

As an example of the execution of the flowchart of FIG. 2, the user can select a set a specific goal of the lawn at step 52 that indicates a lush, thick grass lawn. The controller 110 can execute one or more subroutines at step 54 that are predetermined for use in generating a treatment plan directed toward a lush, thick lawn. The subroutine(s) executed at step 54 can include steps to obtain data regarding the type of grass on the property, historical rainfall and temperature data for the property, grade of the lawn on property, historical sunlight data from the property, and soil analysis data for the property, and ordinances and regulations regarding chemical treatments to land in the jurisdiction of the property. The controller 110 can output a treatment plan at step 56 that includes the application of fertilizer and a list of chemical(s) that are permitted by ordinance/regulation for the property. and retailers of the permitted chemical(s). The controller 110 can be configured to prompt for and accept payment for the treatment plan and any chemical(s) order using the PLC system 10.

Hereinafter, further inventive aspects of the disclosure will be described with reference to FIGS. 3-21.

Figure 3:
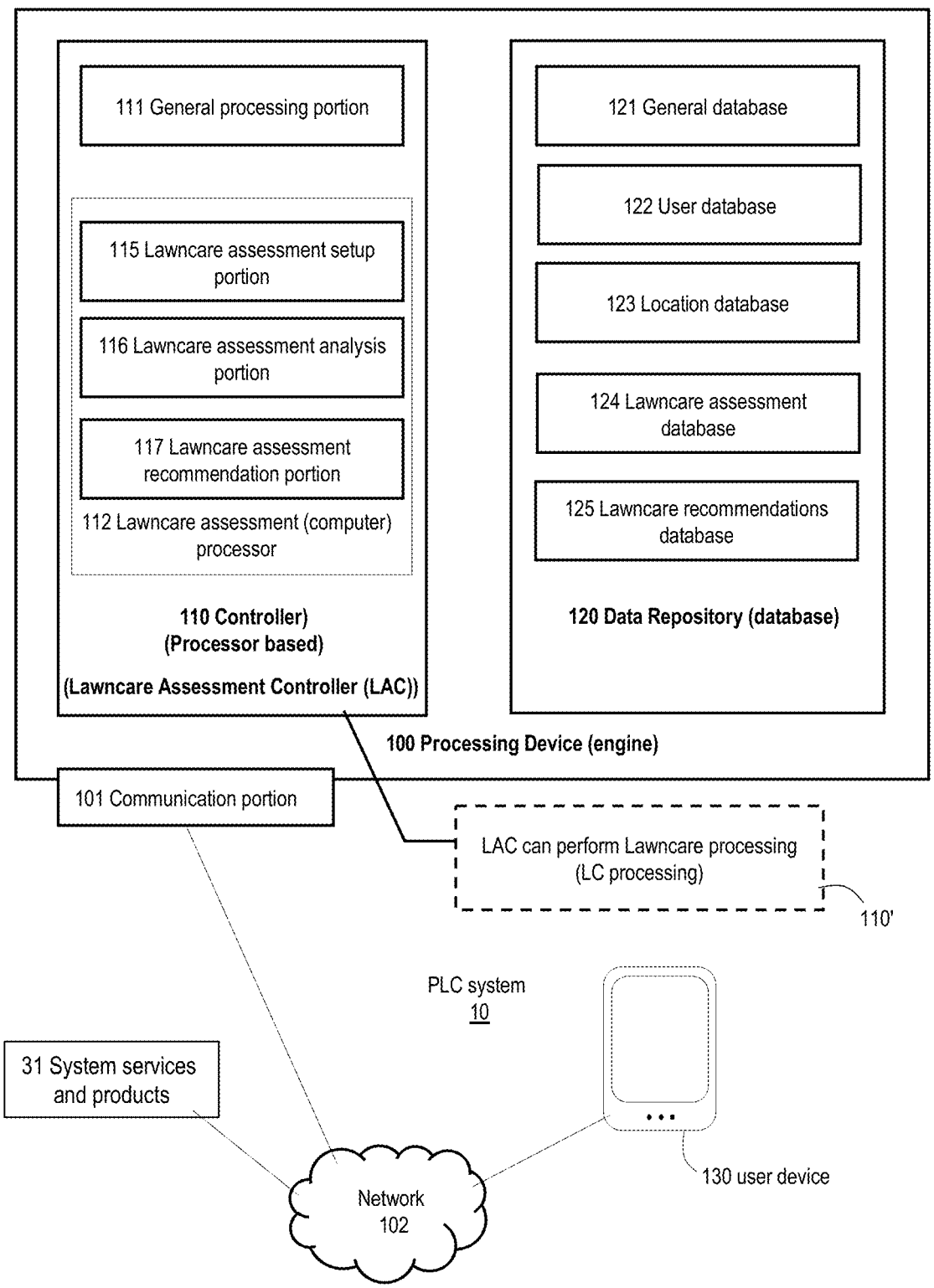
FIG. 3 is a block diagram showing details of the processing device shown in FIG. 1, in accordance with principles of the disclosed subject matter.

FIG. 3 is a block diagram showing further details of the processing device shown in FIG. 1, in accordance with principles of the disclosed subject matter. FIG. 3 illustrates further details of the PLC system 10. The processing device 100 can include controller 110 and data repository 120, as described above. The controller 110 can include a general processing portion 111. The general processing portion 111 can handle overall and more general processing of the processing device 100. The controller 110 can also include a lawncare assessment processor 112. The lawncare assessment processor 112 can perform processing to provide various functionality related to lawncare assessment, as described in detail below. In accordance with principles of the disclosed subject matter, the controller 110 can be described as a lawncare assessment controller (LAC) 110. The LAC 110 can include the lawncare assessment processor 112.

The lawncare assessment processor 112 can include a lawncare assessment setup portion 115, a lawncare assessment analysis portion 116, and a lawncare assessment recommendation portion 117. Further details of such processing portions are described below.

Figure 13:
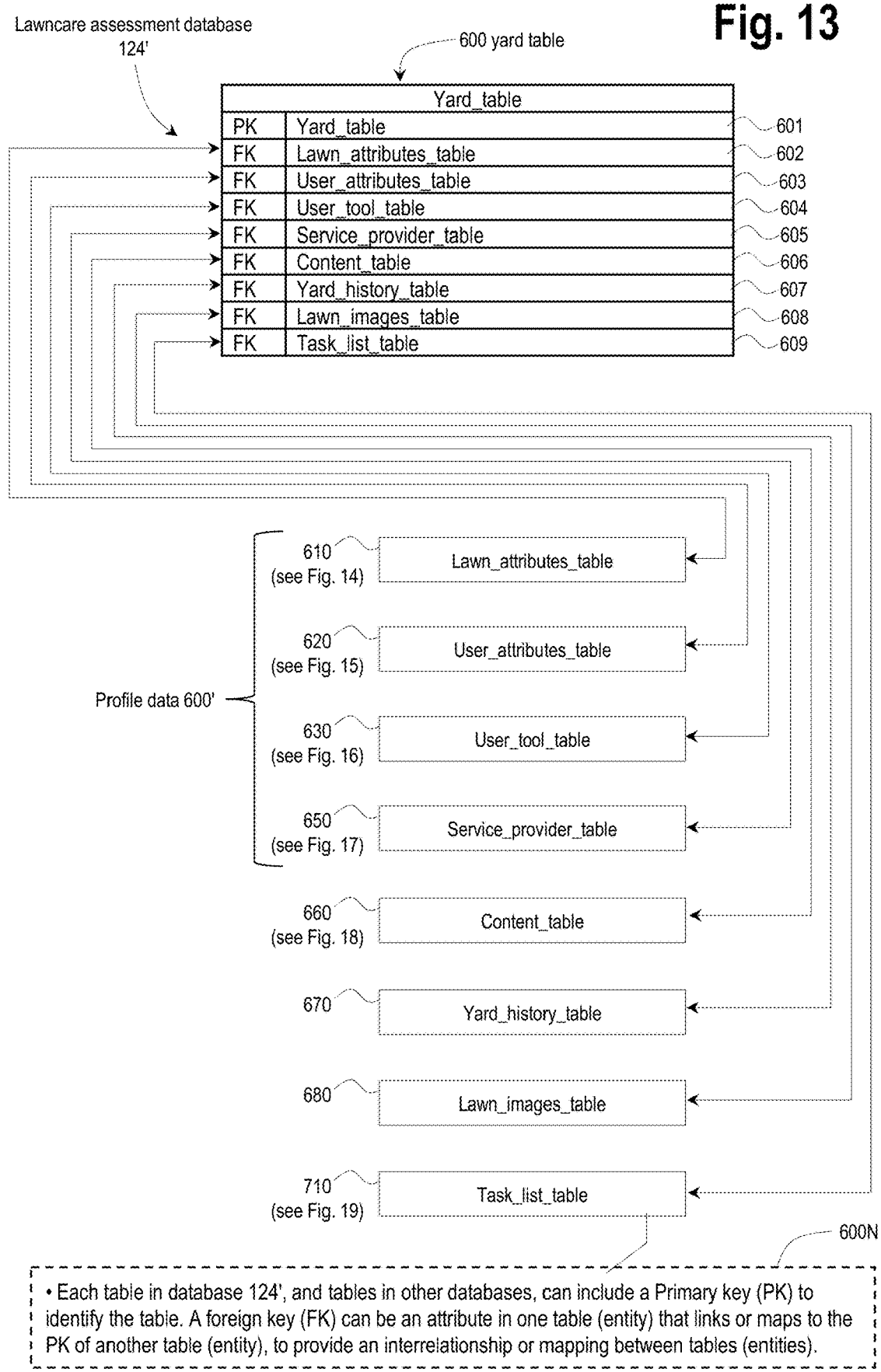
FIG. 13 is a schematic diagram of a database of the disclosure, in accordance with principles of the disclosed subject matter.

The data repository 120 or database 120 can include various databases or sub-databases. The database 120 can include a general database 121, a user database 122, a location database 123, a lawncare recommendations database 124, and a lawncare assessment database 125. The general database 121 can store various data related to overall operations of the processing device 100, including data utilized and generated by the controller 110. The user database 122 can store various data associated with users who utilize the processing device 100. The location database 123 can store various data related to locations that are serviced by or processed by the processing device 100. For example, such a location might be a lawn at a user's place of residence. The lawncare recommendations database 124 can store various data to map observed attributes into recommendations. Such recommendations can then be output to the relevant user. The lawncare assessment database 125 can store various data utilized by and generated by the lawncare assessment processor 112. For example, the lawncare assessment database 125 can store data related to observed lawncare conditions at a location over time. Further details of the data repository 120 are shown in FIG. 13, as well as in FIGS. 14-19 described below. In particular, FIG. 13 shows database 124' which can be included in lawncare assessment database 124, in an embodiment.

As illustrated in FIG. 3, and described above, the PLC system 10 can include a user device 130. The user device can provide a user interface. Various processing is described herein. It is appreciated that processing as described herein can be performed by the LAC 110, of the processing device 100 and/or by processing components in the user device 130. For example, processing as described herein can be performed by an "application" or "app" installed on the user device 130. Databases or data stores used in the processing, as described herein, can be physically disposed either in the data repository 120 and/or in the user device 130. Data can be exchanged between the data repository 120 and the user device 130 as needed. Further details are described below.

Figure 4:
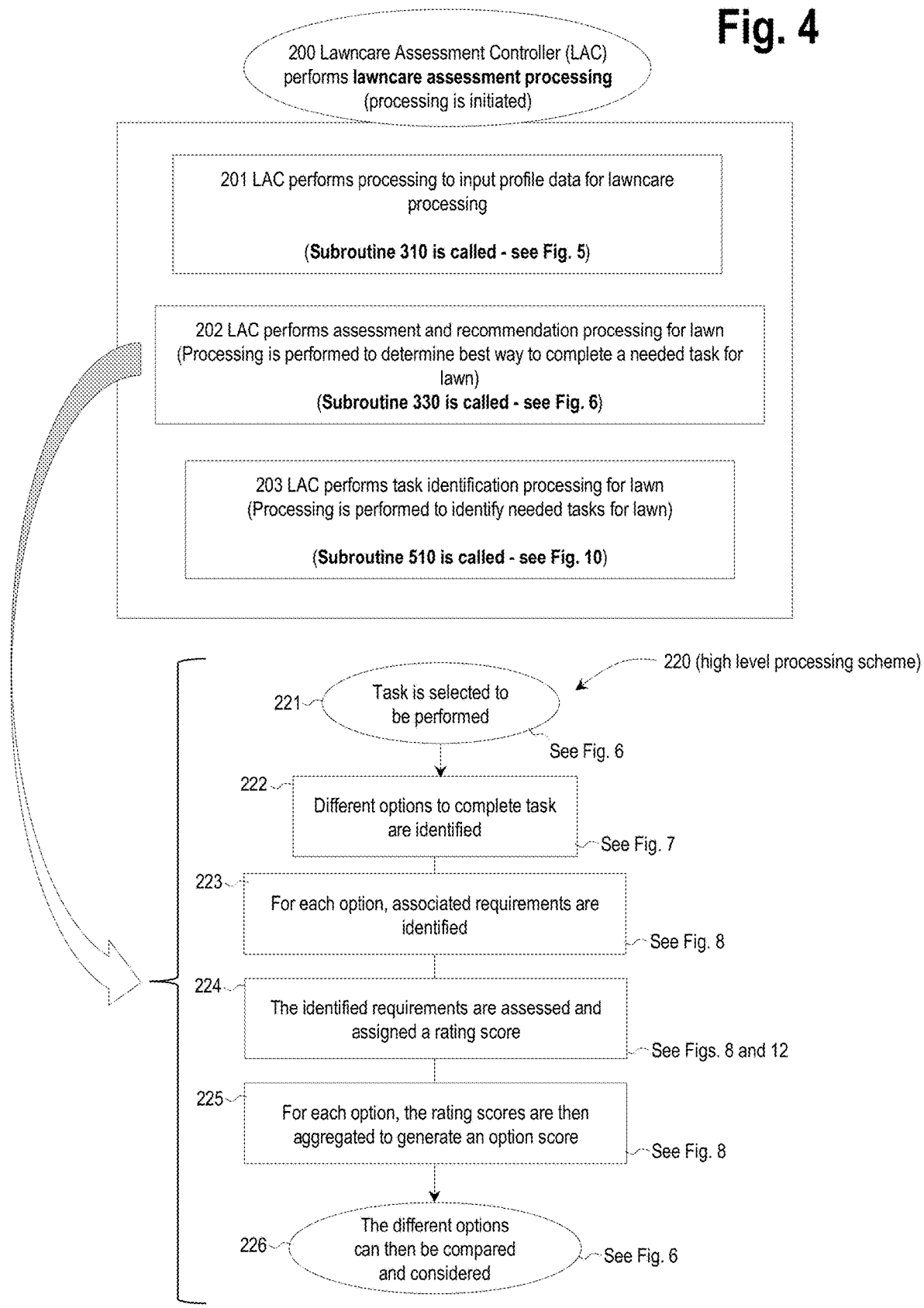
FIG. 4 is a high-level flowchart showing processing that can be performed by the LAC of the disclosure, in accordance with principles of the disclosed subject matter.

Hereinafter, further details will be described regarding the LAC 110 and the various functionality provided by the LAC 110. FIG. 4 is a high-level flowchart showing processing that can be performed by the LAC 110. As reflected in step 200 of FIG. 4, the LAC 110 can perform lawncare assessment processing. The processing of step 200, shown in FIG. 4, can include various processing components including processing of steps 201, 202 and 203.

In step 201, the LAC 110 performs processing to input profile data for lawncare processing. To perform such processing, a subroutine 310 can be called or invoked. Details of subroutine 310 are described below with reference to FIG. 5.

In step 202, the LAC 110 performs assessment and recommendation processing for the lawn. Processing is performed to determine a best way to complete a needed task for lawn. To perform such processing, subroutine 330 can be called or invoked. Details of subroutine 330 are described below with reference to FIG. 6.

In step 203, the LAC 110 performs task identification processing for a lawn. Processing can be performed to identify needed tasks for lawn, such as to identify that the lawn needs to be dethatched. To perform such processing, subroutine 510 can be called or invoked. Details of subroutine 510 are described below with reference to FIG. 10.

FIG. 4 also illustrates a high level processing scheme 220. The processing scheme 220 illustrates various processing components, in a high level and summary manner, that are described in further detail below. As shown, the processing scheme starts in 221 in which a task is selected to be performed. For example, the task that is selected could be mowing the lawn or dethatching the lawn, for example. Details of such processing are described below with reference to FIG. 6.

Then, in step 222, different options to complete the task are identified. For example, there are different options to dethatch a lawn. One option is for the user to home owner to use a hand rake. Another option is to purchase or rent a dethatching machine. A third option is to hire a service provider to dethatch the lawn. Details of the processing of step 222 are described below with reference to FIG. 7.

Then, in step 223, for each option, associated requirements are identified. That is, each option that was identified in step 222 has various requirements. For example, to dethatch a lawn by hand raking has requirements. One of these requirements is the amount of time it takes. Other requirements include to physically possess a hand rake tool and to possess the physical strength to perform such dethatching process. Details of the processing of step 223 are described below with reference to FIG. 8.

Then, in step 224, the identified requirements are assessed and assigned a rating score. In such processing, the requirements can be matched to and compared with corresponding profile data. A matching process can be used in which tags are associated to both a requirement (for the particular option) and profile data that corresponds to and/or is relevant to such requirement. For example, if dethatching a lawn possesses a requirement of 10 hours of time, such requirement would be compared with the profile data indicating how much time is available for the user to engage in such option. Details of the processing of step 224 are described below with reference to FIGS. 8 and 12.

Then, the process passes to step 225. In step 225, for each option, the rating scores for the requirements (that are required for such option) are then aggregated together so as to generate an option score. In other words, an option is initially broken down into requirements, as reflected in step 223. Each of those requirements are then assigned a rating score. Then, those rating scores are aggregated together so as to form an option score (for the particular option). Details of such processing are described below with reference to FIG. 8.

After step 225, the process passes to step 226. In step 226, the different options can be compared and considered, and presented to the user. Further details are described below with reference to FIG. 6.

Figure 5:
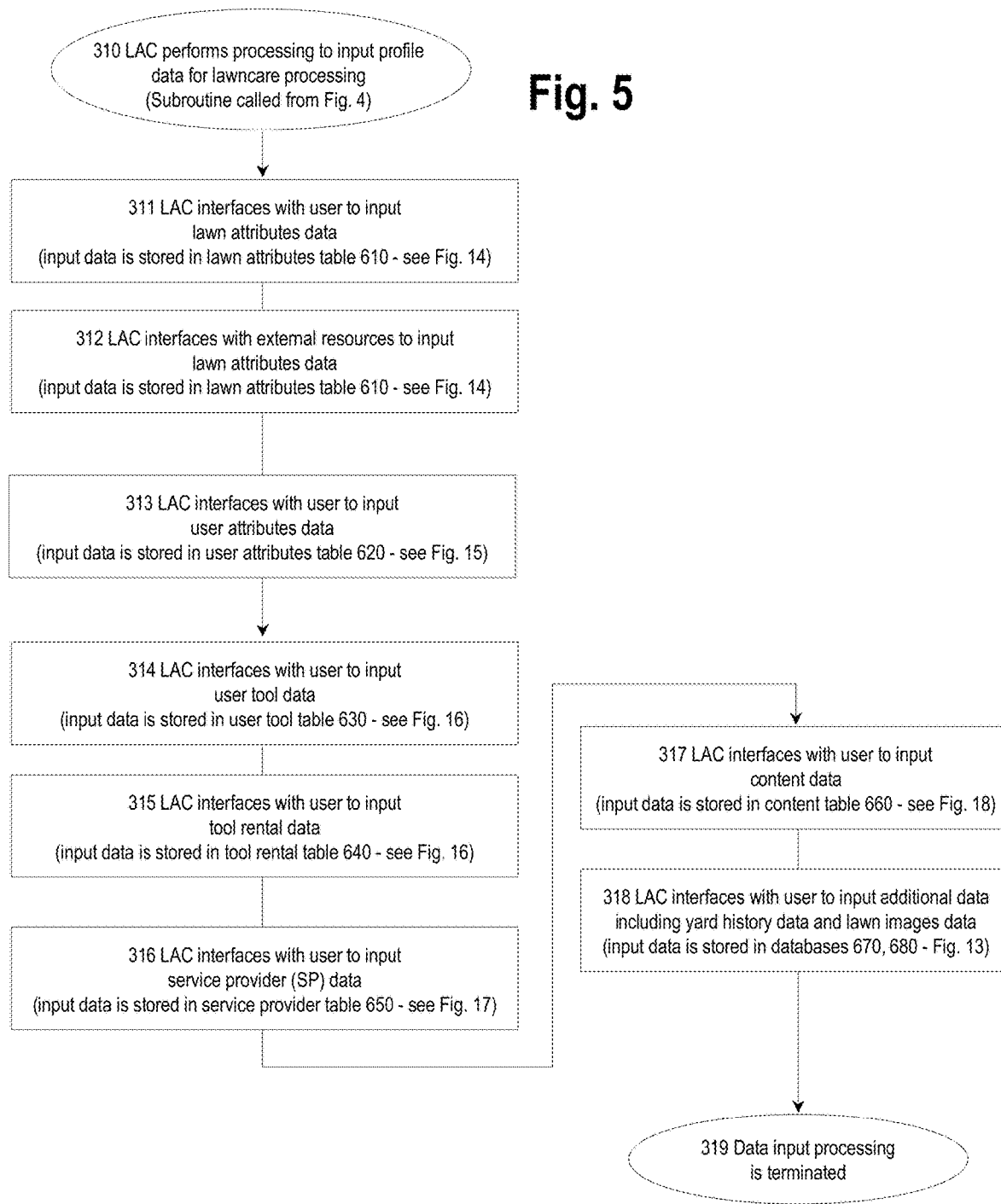
FIG. 5 is a flowchart showing details of "LAC performs processing to input profile data for lawn care processing" of a subroutine, in accordance with principles of the disclosed subject matter.

FIG. 5 is a flowchart showing details of "LAC performs processing to input profile data for lawn care processing" of subroutine 310. Subroutine 310 can be called or invoked from the processing of FIG. 4. The process or subroutine is initiated and passes to step 311. For example, the processing of FIG. 5 can be performed by the lawncare assessment setup portion 115, for example.

In step 311, the LAC 110 interfaces with the user to input lawn attributes data. In particular, such lawn attributes data can include data regarding physical attributes and characteristics of the lawn under consideration. The input data can be stored in the lawn attributes table 610, shown in FIG. 14. The lawn attributes table 610 can be a table in a database utilized by the LAC 110. Various details regarding such database, including the architecture of such database, are described below. For example, the lawn attributes table 610 can be part of the lawncare assessment database 124 and/or can be part of the data repository 120, in general.

With further reference to FIG. 5, after step 311, the process passes to step 312. In step 312, the LAC 110 interfaces with external resources to input lawn attributes data. For example, the LAC 110 could interface with weather resources 34 shown in FIG. 1. The LAC 110 could input future or historical weather data to determine how much rainfall a lawn will receive and how much rainfall a lawn has received. Also, satellite data could be input to provide the amount of tree cover or foliage on the lawn. The data input in step 312 can also be stored in the lawn attributes table 610. Then, the process passes to step 313.

Figure 15:
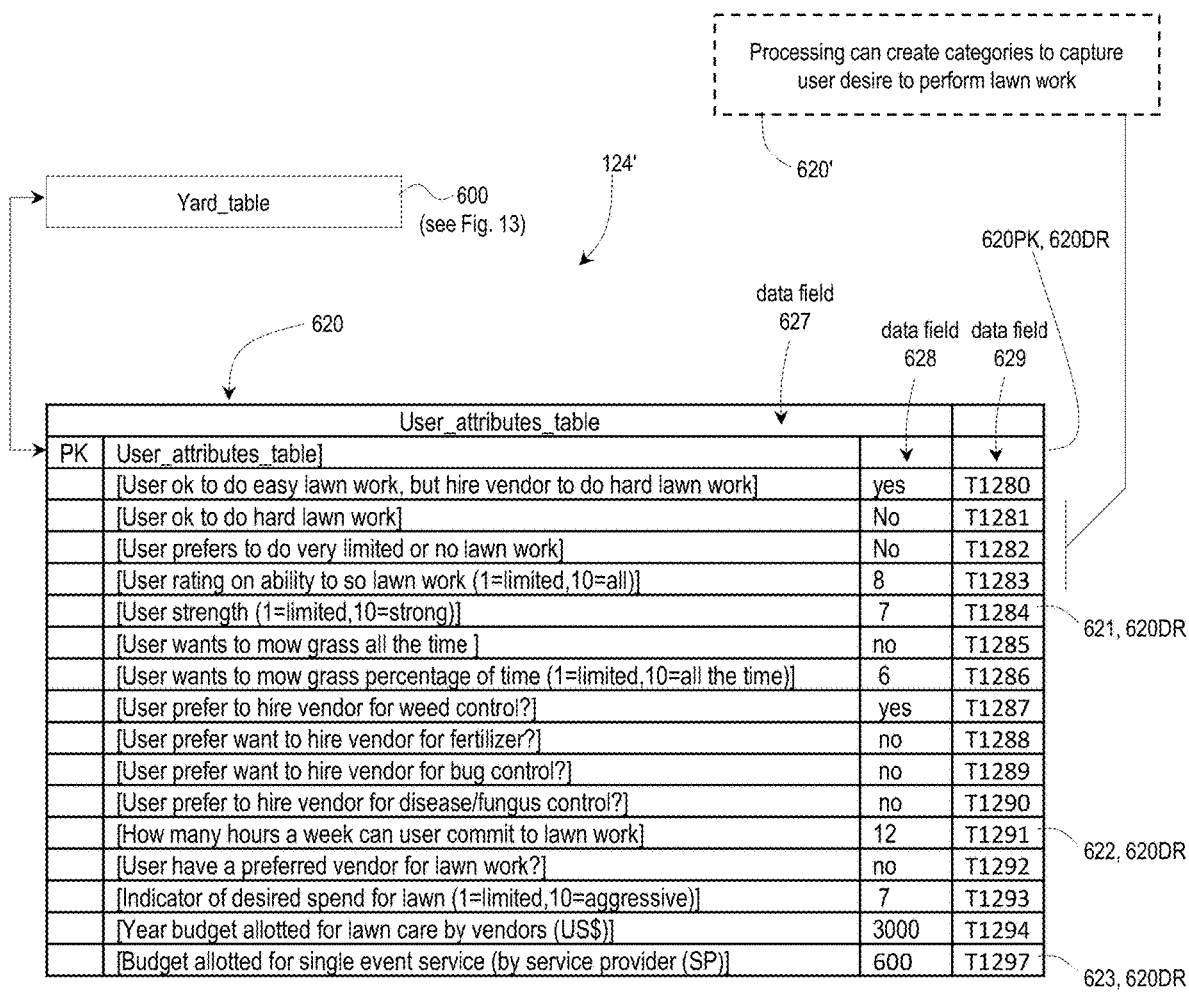
FIG. 15 is a schematic diagram that shows further details of the database of FIG. 13 including content of a user attributes table, in accordance with principles of the disclosed subject matter.

In step 313, the LAC 110 interfaces with the user to input user attributes data. Such input data can be stored in the user attributes table 620 as shown in FIG. 15. Such data can include a wide variety of information regarding a user's preferences and other data regarding a user. For example, as noted at 620' in FIG. 15, the processing of the disclosure can create categories to capture a user's desire or inclination to perform lawn work or yardwork. Such categories can be represented in respective data records. For example, a user might be okay to do easy lawn work, but hire a vendor or service provider to do hard lawn work; a user might be okay do hard lawn work; or a user might prefer to do very limited or no lawn work. As shown in FIG. 15, various other data can be stored in the user attributes table 620.

With further reference to FIG. 5, in step 314, the LAC 110 interfaces with the user to input user tool data. In this processing, the LAC 110 can interface with the user to determine which tools are available to perform various tasks at hand. In the processing as described herein, the availability of a particular tool can affect the option score for a particular option to perform a task. For example, if the user does not own a lawnmower, then a do-it-yourself (DIY) option for mowing the lawn would receive a much lower option score than if the owner did own a lawnmower. The various data input in the processing of step 314 can be stored in the user tool table 630 shown in FIG. 16. As shown, the user tool table 630 can include a wide variety of information about which tools are available for use in performing lawn care tasks.

Then, in step 315, the LAC 110 interfaces with the user to input tool rental data. Such data relates to rental options that are available to the user. Input data can be stored in the tool rental table 640 shown in FIG. 16. Such tool rental table 640 can be linked to the user tool table 630, i.e., linked to a "tool rental resource table" data record 632 in the user tool table 630. For example, data in the tool rental table 640 can include a listing of entities that rent tools that could be used in lawncare work. Also, it is appreciated that the tool rental table 640 can be further linked with additional data resources. For example, the Home Depot data record 642 can be linked to the Home Depot database so as to provide rental data to the LAC 110.

After step 315, the process passes to step 316. In step 316, the LAC 110 interfaces with the user to input service provider (SP) data. Such input data can be stored in the service provider table 650 shown in FIG. 17. The service provider data can include various service providers that are available to the user. For example, the service provider data stored in table 650 can include a listing of various service providers or lawn care services that are in geographical proximity to the lawn under consideration.

Figure 18:
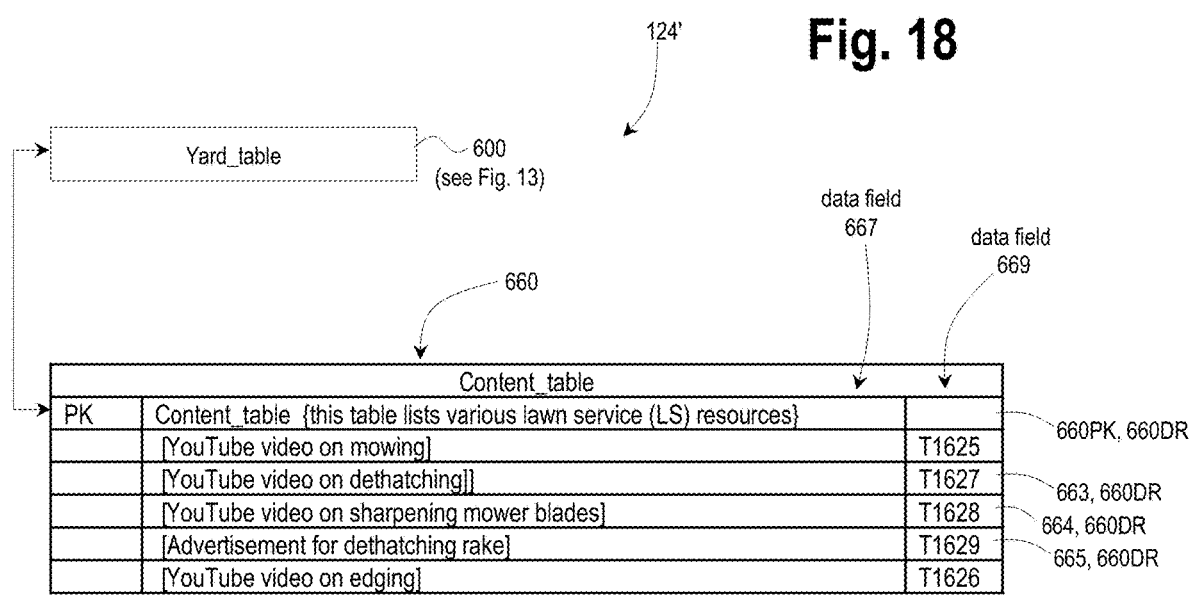
FIG. 18 is a schematic diagram that shows further details of the database of FIG. 13 including content of a content table, in accordance with principles of the disclosed subject matter.

Then, in step 317, the LAC 110 interfaces with the user to input content data. Such input data can be stored in content table 660 shown in FIG. 18. Such content data can include various web or Internet resources that are relevant or germane to a particular task at hand. As described further below, one or more identified tasks can be presented to the user with options to complete such task. In presentation of a task or listing of tasks to the user, content relevant to such task can also be presented to the user. For example, if a task is mowing the lawn, then a YouTube video on sharpening mower blades might be provided to the user. Such content is provided in data record 664 of the content table 660. Also, for example, options can be presented to the user regarding dethatching the lawn. In conjunction with the presentment of such options to the user, content set forth in data record 663 and 665 (of table 660—FIG. 18) can be presented to the user. Such content can be associated with or linked to a particular option, or more particularly to a requirement of an option, using tags in data field 669, as shown in FIG. 18. The use of such tags and the association or mapping between a requirement and content (related to such requirement) are described below.

After step 317, the process passes to step 318. In step 318, the LAC 110 interfaces with the user to input additional data including, for example, yard history data and lawn images data, which can include various images of the lawn. Such input data can be stored in databases 670 and 680, as shown in FIG. 13. After step 318, the process passes to step 319. In step 319, the data input processing is terminated.

It is appreciated that various other data related to lawn care and the user can be used in the systems and methods of the invention, and the disclosure is not limited to the particulars described herein. Also, it should be appreciated that the sequence of processing shown in FIG. 5 is for purposes of illustration only. It is of course appreciated that the input of data can be input in any desired order or manner. The input of data can be prompted by the LAC 110 interfacing with the user. The input of data can be prompted by the user wanting to supplement data that is used by the LAC 110, for example.

Figure 6:
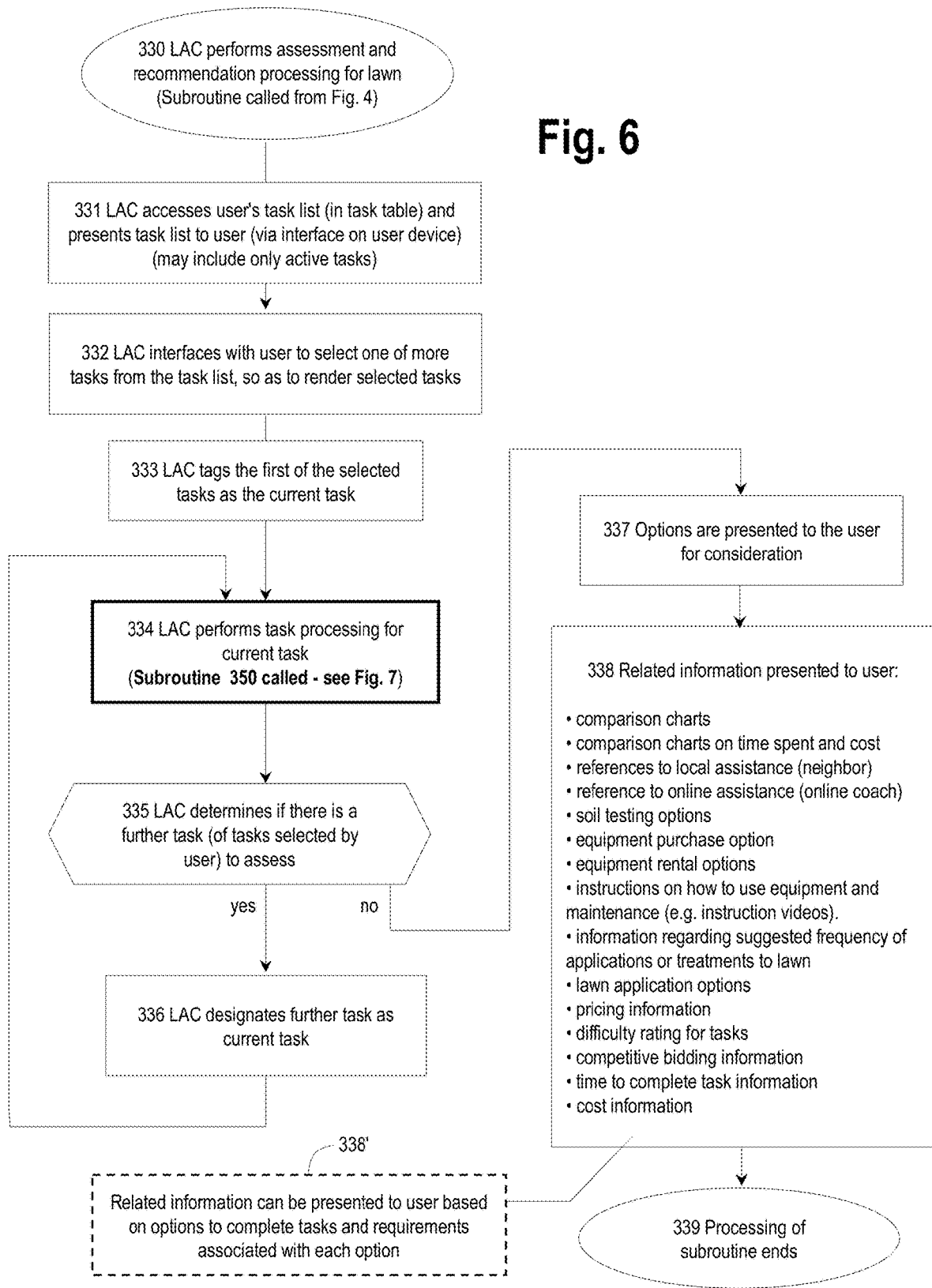
FIG. 6 is a flowchart showing details of "pod performs assessment recommendation processing for lawn" of a subroutine, in accordance with principles of the disclosed subject matter.

FIG. 6 is a flowchart showing details of "LAC 110 performs assessment recommendation processing for lawn" of subroutine 330. Subroutine 330 can be called from the processing of FIG. 4. The process is initiated and passes to step 331. The processing of FIG. 6, for example, can be performed by the lawncare assessment recommendation portion 117, for example.

Figure 19:
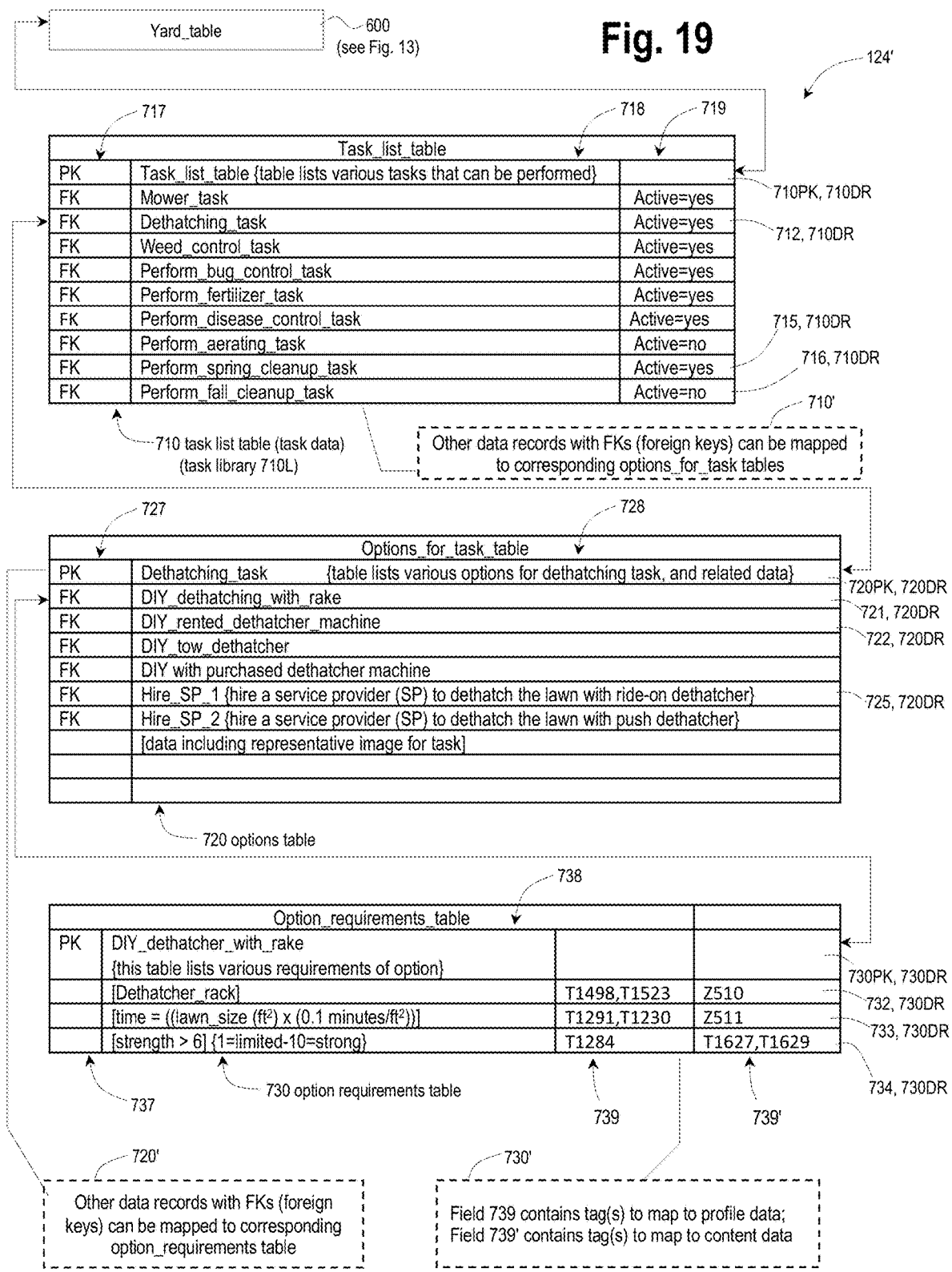
FIG. 19 is a schematic diagram that shows further details of the database of FIG. 13 including content of a task list table, an options for task table, and an option requirements table, in accordance with principles of the disclosed subject matter.

In step 331, the LAC 110 accesses a user's task list 710 as shown in FIG. 19. The task list 710 can be in the form of a Task_list_table 710, which is maintained in data repository 120, in the user device, and/or in some other data store or database. The LAC 110 can present a task list to the user on a user device. In accordance with one embodiment, tasks in the task list table 710 can be tagged as active or not active. In one embodiment, only the active tasks would be presented to the user for consideration. The task list table can be described as a task table.

After step 331, the process passes to step 332.

In step 332, the LAC 110 interfaces with user to select one or more tasks from the task list. As result, the tasks, which are selected, are tagged or rendered as selected tasks.

Then, in step 333, the LAC 110 tags the first of the selected tasks as the current task. Then, the process passes to step 334. In step 334, the LAC 110 performs task processing for the current task, i.e., so as to process the current task. To perform this processing, subroutine 350 can be called, as described below with reference to FIG. 7.

Once subroutine 350 is performed, the process passes to step 335. In step 335, the LAC 110 determines if there is a further task, of the tasks selected by the user, to assess. If yes, then the process passes to step 336. In step 336, the LAC 110 designates the further task as the current task. Processing then returns to step 334, and continues as described above.

Alternatively, a no may be rendered in step 335. That is, the LAC 110 determines that there is not a further task to assess. As result, the process passes to step 337. In step 337, some or all of the identified options are presented to the user for consideration, in an embodiment of the disclosure. The options that are presented can be the options that are queued in the processing of steps 386, 387 and/or 388. After step 337, the process passes to step 338.

In step 338, related information or resources are presented to the user so as to supplement or complement the options presented in step 337. As noted at 338', related information can be presented to the user based on options to complete a particular task or tasks, and requirements associated with each option. For example, the related resources could relate to information, comparison charts, task lists, references to local assistance (such as a neighbor who participates in the lawncare), a reference to an online coach, online resources, information regarding accessing other resources, any other content noted in step 338 of FIG. 6, and/or any other content as may be desired that might be helpful to the user to complete the particular task. Such content can be presented via a user interface on a user device, emailed to the user, or communicated to the user in some other manner or over some other communication channel.

Figure 7:
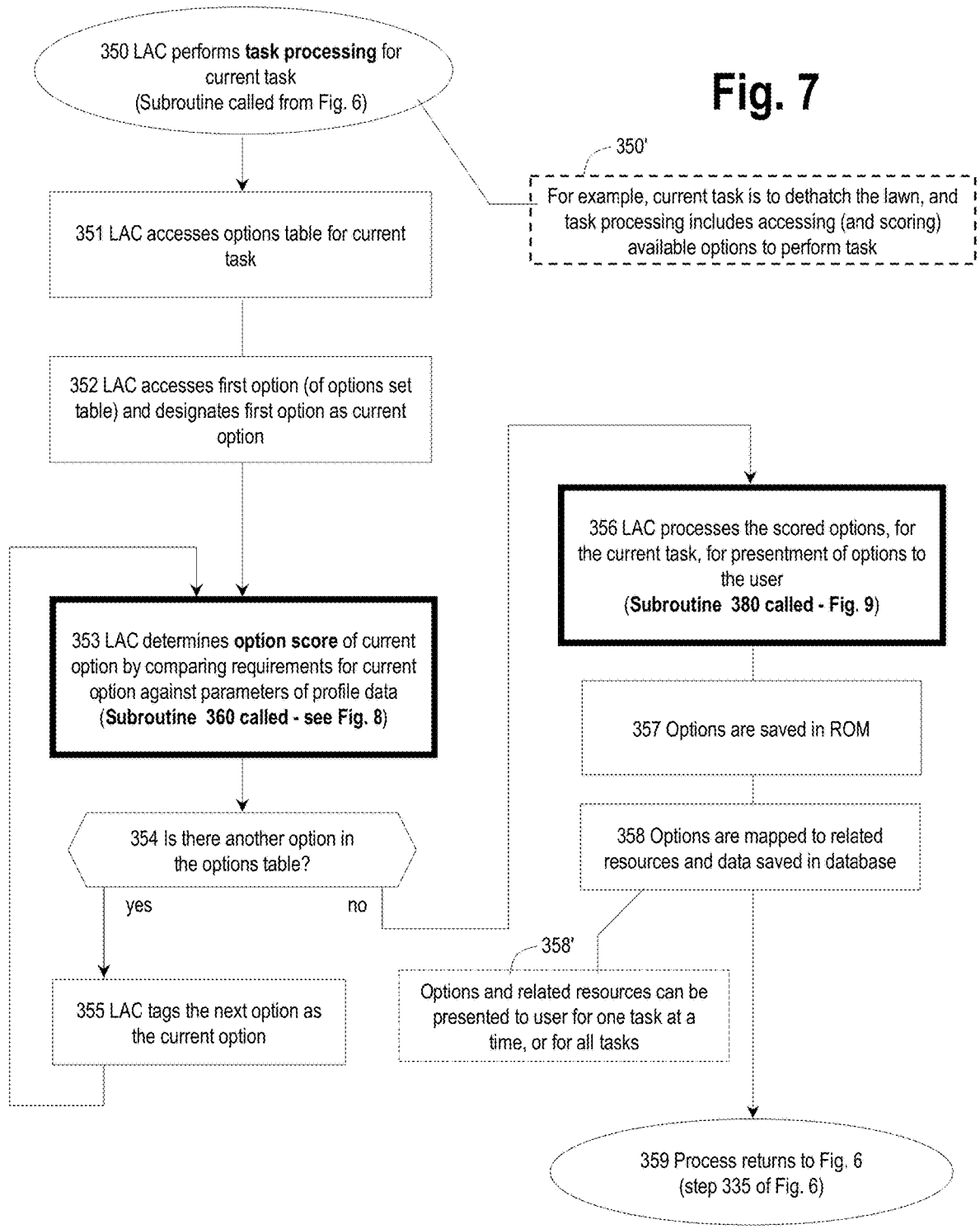
FIG. 7 is a flowchart showing details of "pod performs task processing for the current task" of a subroutine, in accordance with principles of the disclosed subject matter.

FIG. 7 is a flowchart showing details of "LAC 110 performs task processing for the current task" of subroutine 350. Subroutine 350 can be called from the processing of FIG. 6, as described above. As noted at 350', for example, the current task might be to dethatch the lawn. The task processing of FIG. 7 relates to accessing (and scoring) available options to perform the task. Such available options can include DIY options. Alternatively, available options can include hiring a service provider (SP) or a lawn service, i.e., a lawn service entity, to perform the dethatching task.

The process of FIG. 7 is initiated and passes to step 351. In step 351, the LAC 110 accesses the options table, i.e., the options_for_task_table 720 for the current task. That is, the LAC 110 accesses available options that might be utilized so as to perform or execute the current task of dethatching. Such options table 720 is shown in FIG. 19. The options table 720 lists the various options that are available for performing the desired dethatching task. After step 351, the process passes to step 352.

In step 352, the LAC 110 accesses the first option, of the options table 720. Such first option is shown in data record 721, in options table 720 of FIG. 19. For example, such first option is a DIY dethatching option using a rake. That is, such first option contemplates the user physically using a handheld rake to dethatch the lawn. In step 352, the LAC 110 designates or tags the first option is the current option.

The processing of step 352 can be described as mapping, based on task data, to first data regarding a first candidate option. The first candidate option can be considered for performance of the particular task. The first data can include data regarding requirements of the particular option. Such processing can also include mapping, based on the task data, to second data regarding a second candidate option. The second candidate option can also be considered for the task. The second data can include data regarding requirements of the particular option. Additional options can also be considered including a third candidate option and a fourth candidate option. For example, a first candidate option might relate to a DIY option, and a second candidate option might relate to a service provided option.

As otherwise described herein, the first data regarding a first candidate option can be compared with profile data to generate a first option score. The second data regarding a second candidate option can then be compared with the profile data to generate a second option score. The processing of the disclosure can then present the options, along with corresponding scores, to the user. Other related processing can be performed.

The profile data used in such processing can include profile data 600' as illustrated in FIG. 13. However, any other profile data or any other data can be used as desired. In an embodiment, profile data can include area attribute data that can include data regarding condition of the area. Such data is illustrated in the content of lawn attributes table 610, in FIG. 14. In an embodiment, profile data can include user attribute data. Such user attribute data can include data regarding attributes of the particular user who will be doing the work. Such data is illustrated in the content of user attributes table 620.

Relatedly, it is appreciated that processing of the LAC 110 can take into account the possibility that different users may perform different tasks on the lawn. That is, there may be two homeowners, or two persons, that do different tasks on a particular lawn. To accommodate for such situation, functionality can be provided wherein a first user interfaces with the system to specify whether the first user or a second user will be performing the task. If the first user is indicated as performing the tasks, then the LAC 110 will access profile data for the first user. Such profile data of the first user can then be used in processing akin to that shown in FIG. 12, for example. However, if the second user is indicated as being the one to perform the tasks, the LAC 110 will access the profile data for the second user. In addition, the processing of the disclosure can generate option scores for both the first user and the second user. As a result, the LAC 110 can provide an assessment of whether the first user or the second user is best suited to perform a particular option, of a particular task.

With further reference to FIG. 7, after step 352, process passes to step 353. In step 353, the LAC 110 determines an option score for the current option. In accordance with an embodiment, the option score is determined by comparing the requirements for the current option against parameters of profile data 600', as illustrated in FIG. 13. The profile data 600', in particular, can include lawn attribute table 610, user attributes table 620, and the various other data associated with the lawn and/or associated with the user, for example. The processing of step 353 can be performed by subroutine 360, which is described below with reference to FIG. 8.

After the processing of step 353 in the processing of subroutine 360, the process passes to step 354. In step 354, the LAC 110 determines if there is another option in the options table. In the present example, there would be another option in the options table 720 as shown in data record 722, i.e., for the user to rent a dethatcher machine. Accordingly, a yes would be rendered in step 354. The process then passes to step 355. In step 355, the LAC 110 tags the next option is the current option. Processing then returns to step 353 and continues on as described above.

However, at a point, there will not be another option in the options table 720. Accordingly, a no will be rendered in step 354, and the process will pass to step 356. In step 356, the LAC 110 processes the scored options, for the current task, for presentment of options to the user. Such processing can be performed by subroutine 380 described below with reference to FIG. 9. Then, in step 357, the options are saved into memory, such as into ROM memory. Then, in step 358, the options are mapped to related resources, as described further below, and data saved in the database of the LAC 110. As reflected at 358', the options and related resources can be presented to the user for a single task. Alternatively, the options and related resources can be presented for multiple tasks.

After step 358, the process passes to step 359. In step 359, the process returns to FIG. 6, and more specifically, passes to step 335 of FIG. 6.

Figure 8:
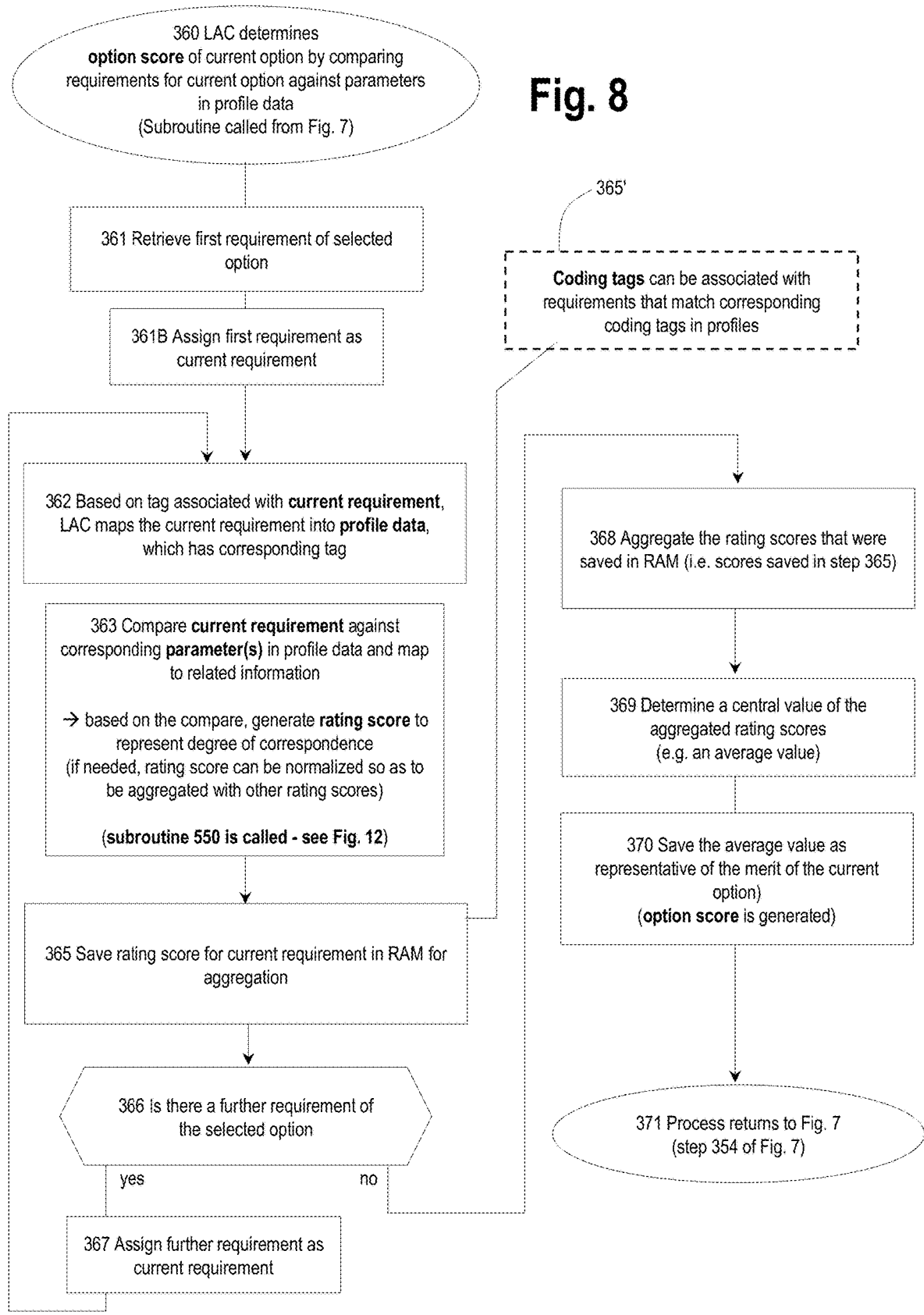
FIG. 8 is a flowchart showing details of "pod determines option score of current option by comparing requirements for current option against parameters in profile data" of a subroutine, in accordance with principles of the disclosed subject matter.

FIG. 8 is a flowchart showing details of "LAC 110 determines option score of current option by comparing requirements for current option against parameters in profile data" of subroutine 360. Subroutine 360 can be called from the processing of FIG. 7, as described above. The processing of FIGS. 8 and 12, for example, can be performed by the lawncare assessment analysis portion 116, for example.

Subroutine 360 is initiated and passes to step 361. In step 361, the LAC 110 retrieves a first requirement of the selected option. Illustratively, with reference to FIG. 19, the option provided in data record 721 (of options table 720) can be mapped to the various requirements of such option. That is, the option provided in data record 721 can be mapped to option requirements table 730. The table 730 shows that there are 3 requirements for the option of data record 721. Such 3 requirements include having the needed tool, i.e., a dethatcher rake; having the required time; and possessing a sufficient strength value. As otherwise described herein, if these 3 requirements map are well into the profile of the lawn and/or the profile the user, then the option of data record 721 will rank well. However, if the user does not have the appropriate rake and the user is of limited strength, then the option of data record 721 will not be a good option. Further details are described below. Relatedly, it is noted that other options in table 720 can each be mapped to a set of options, i.e., to an options requirements table. That is, as reflected at 720', other data records (in table 720) with FKs (foreign keys) can be mapped to corresponding option_requirements tables. Also, as reflected at 710', other data records (in table 710) with FKs can be mapped to corresponding options_for_task tables, in similar manner to the way that data record 712 is mapped to table 720.

With further reference to FIG. 8, after step 361, the process passes to step 361B. In step 361B, the LAC 110 assigns the first requirement as the current requirement. Then, in step 362, based on a tag(s) associated with the current requirement, the LAC 110 maps the current requirement into profile data, which has a corresponding tag. As shown in FIG. 19, data record 732, as well as data records 733, 734 include respective tags, i.e., tag types. In an embodiment, one or more tags associated with a requirement allows a particular requirement to be effectively mapped to, and compared with, a corresponding parameter in the profile set. As noted at 730' in FIG. 19, field 739 can contain tag(s) to map to profile data; and field 739' can contains tag(s) to map to content data. Data record 730PK, of table 730 in FIG. 19, can contain a primary key to map to the higher level Options_for_task_table 720.

Figure 14:
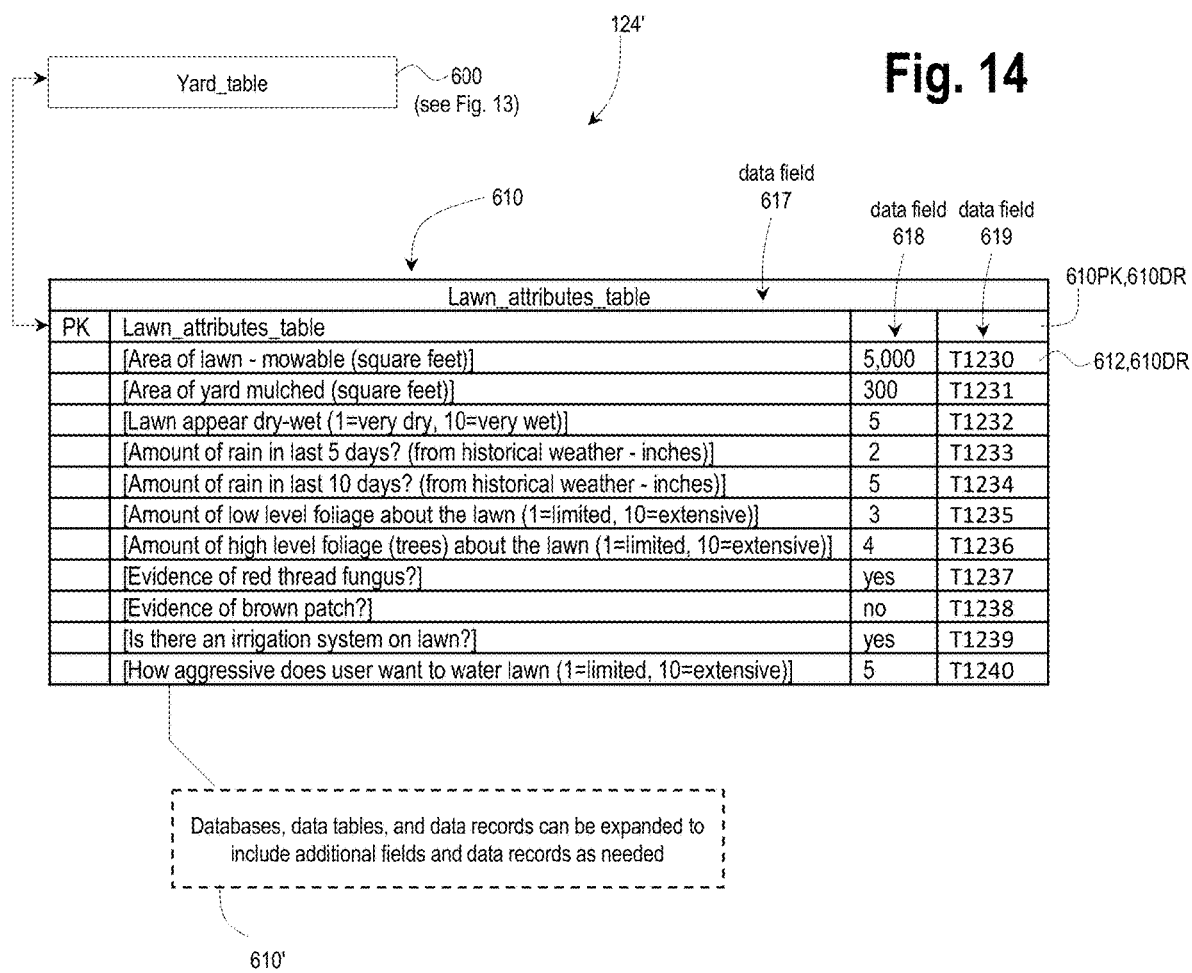
FIG. 14 is a schematic diagram that shows further details of the database of FIG. 13 including content of a lawn attributes table, in accordance with principles of the disclosed subject matter.

That is, once the current requirement is mapped into a profile data, in step 362, the process passes to step 363. In step 363, the processing compares the current requirement against a corresponding parameter in the profile data. As otherwise described herein, the profile data includes data in lawn attribute table 610 and in user attribute table 620, for example, as shown in FIGS. 14 and 15 respectively.

Also, in step 363, based on the comparison, the LAC 110 generates a rating score to represent a degree of correspondence between the current requirement and a corresponding parameter in the profile data. In order to aggregate such rating score with rating scores of other requirements (of the current option) the rating score can be normalized or standardized. After step 364, the process passes to step 365. In step 365, the LAC 110 saves the rating score for the current requirement in RAM or in other memory. The rating score is saved for aggregation with other rating scores, for other requirements of the current option. Such aggregation with other rating scores can be performed in step 368 described below. After step 365, the process passes to step 366.

In step 366, the LAC 110 determines if there is a further requirement of the selected option. For example, such further requirement might include the time requirement of data record 733 in the option requirement table 730, shown in FIG. 19. If a yes is rendered in step 366, the process passes to step 367. In step 367, the LAC 110 assigns the further requirement is the current requirement. Accordingly, the further requirement will be processed in the same manner as the prior requirement. More specifically, the processing will pass back to step 362 of FIG. 8. Processing will then continue as described above.

At one point in the processing, in step 366, the LAC 110 will determine that there is not a further requirement of the selected option. Accordingly, a no will be rendered in step 366, and the process will pass to step 368. In step 368, the LAC 110 will aggregate the rating scores that were saved into memory. That is, the LAC 110 will aggregate the rating scores that were saved in step 365 for each respective requirement, of the option under consideration.

After step 368, the process passes to step 369. In step 369, the LAC 110 generates a representative value for the aggregated rating scores. For example, the representative value might be the average value of the rating scores. As noted above, the rating scores can be normalized so as to be conducive for comparison and conducive to generate an average value. Additionally, it is appreciated that one or more rating scores could be "weighted." Such a weighting of a particular rating score could result in one requirement being more heavily considered or less heavily considered as compared to another requirement.

Then, in step 370, the representative value, i.e., the average value in this example, is saved as representative of the merit of the current option. That is, the processing of step 370 generates an option score for the option under consideration. After step 370, the process passes to step 371.

In step 371, the process returns to FIG. 7, and specifically the process passes to step 354 of FIG. 7.

Figure 9:
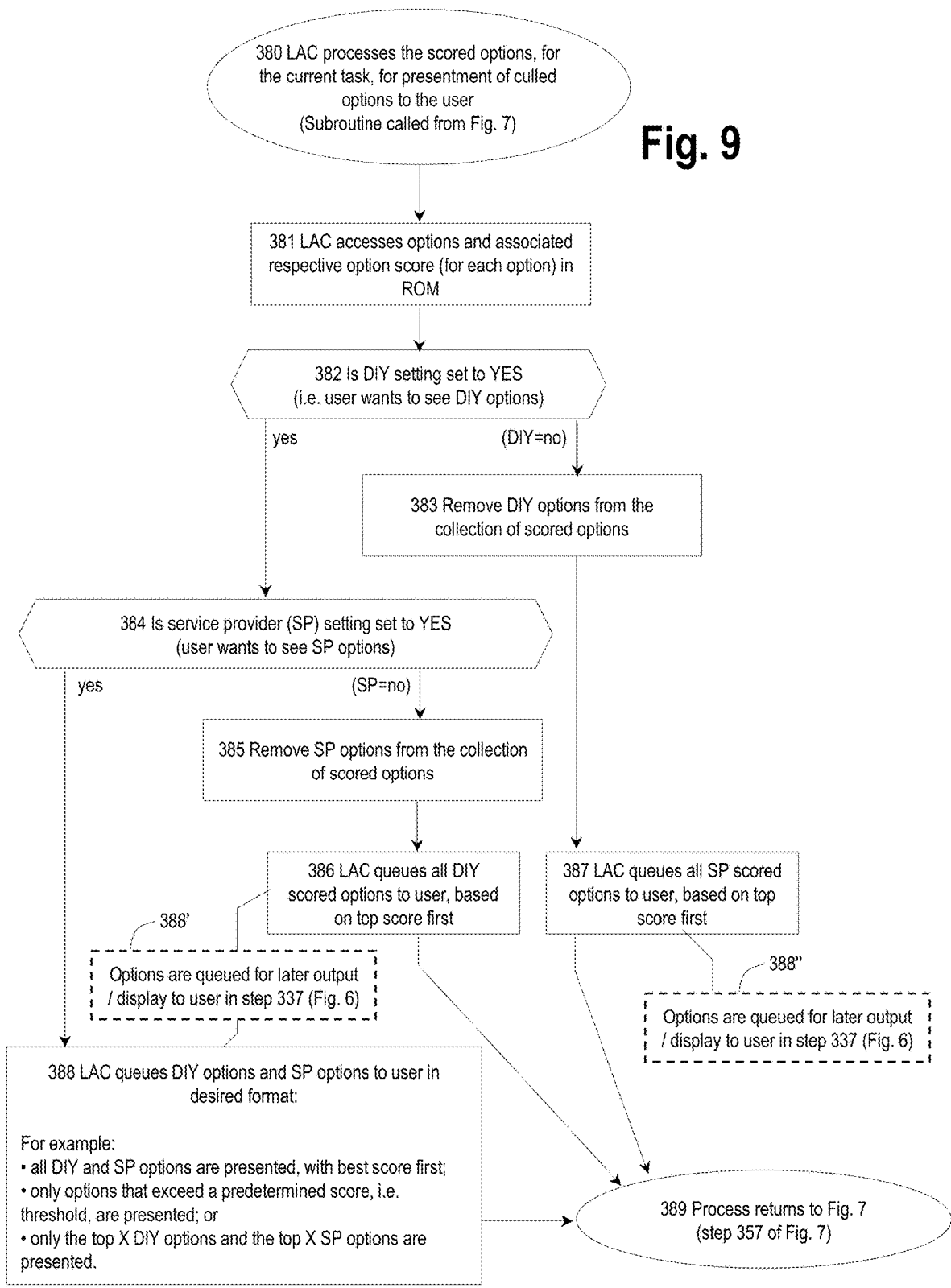
FIG. 9 is a flowchart showing details of "LAC processes the scored options, for the current task, for presentment of culled options to the user" of a subroutine, in accordance with principles of the disclosed subject matter.

FIG. 9 is a flowchart showing details of "LAC processes the scored options, for the current task, for presentment of culled options to the user" subroutine 380. Subroutine 380 can be called from the processing of FIG. 7. Subroutine 380 is initiated and passes to step 381. In step 381, the LAC 110 accesses options, which are under consideration. The LAC 110 also accesses the option score for each of the options, which were identified in the processing above. For example, the option scores can be stored in short-term memory. Then, the process passes to step 382.

In step 382, the LAC 110 checks if the user has set the DIY setting to yes. In other words, has the user indicated that she wants to see DIY options for the particular task at hand. If yes, then the process passes to step 384. In step 384, the LAC 110 checks if the service provider (SP) setting is also to yes. Such indicates that the user also wants to see SP options. If a yes is rendered in step 384, the process passes to step 388. That is, such processing indicates that the user wants to see both SP options and DIY options. In step 388, the LAC 110 queues the DIY options and the SP options to be presented (to the user) in a desired format, i.e., in step 337, of FIG. 6. That is, as noted at 388', options can be queued for later output/display to the user in step 337 (FIG. 6).

The desired format for presentment of the options can be in any format and content as desired, and can be presented on a user interface of a user device, for example. For example, all DIY and SP options can be presented with best score first. Only options that exceed a predetermined score, i.e., threshold, can be presented to the user. Also, only the top X DIY options and the top X SP options can be presented. For example, the top (X=1, 2, 3, 4, 5, 10 . . . ) can be presented to the user.

Alternatively, with further reference to step 382, it may be that a no is rendered in step 382. The process then passes to step 383. In step 383, the LAC 110 culls or removes all the DIY options from the collection of scored options. Accordingly, the DIY options will not be presented to the user, based on the user's settings. Then, in step 387, the LAC 110 queues all SP scored options to the user. In this example, all the SP options can be presented with the top scores being presented first, in ordered manner. However, as in step 388, it is appreciated that the SP scored options can be queued and later presented in any manner or in any organizational scheme as desired. That is, as noted at 388', options can be queued for later output/display to the user in step 337 (FIG. 6).

With further reference to step 384 of FIG. 9, it may be that a no is rendered in step 384. As a result, the process passes to step 385. In step 385, the LAC 110 culls or removes all the service provider (SP) options from the collection of scored options. Accordingly, the SP options will not be presented to the user, based on the user's settings. Then, in step 387, the LAC 110 queues all the DIY scored options for presentment to the user. In this example, all the DIY options can be presented (in step 337 of FIG. 6) with the top scores being presented first, in ordered manner. However, as in step 388, it is appreciated that the DIY scored options can be queued and later presented in any organizational scheme or manner as desired. That is, as noted at 388", options can be queued for later output/display to the user in step 337 (FIG. 6). In accordance with some embodiments of the disclosure, if a particular option (with associated requirements) is not precluded or incompatible the profile data, then the option can be presented to the user for consideration.

After any of steps 386, 387, and 388 the process passes to step 389 as shown in FIG. 9. In step 389, the process returns to FIG. 7, and specifically passes to step 357 of FIG. 7.

Figure 10:
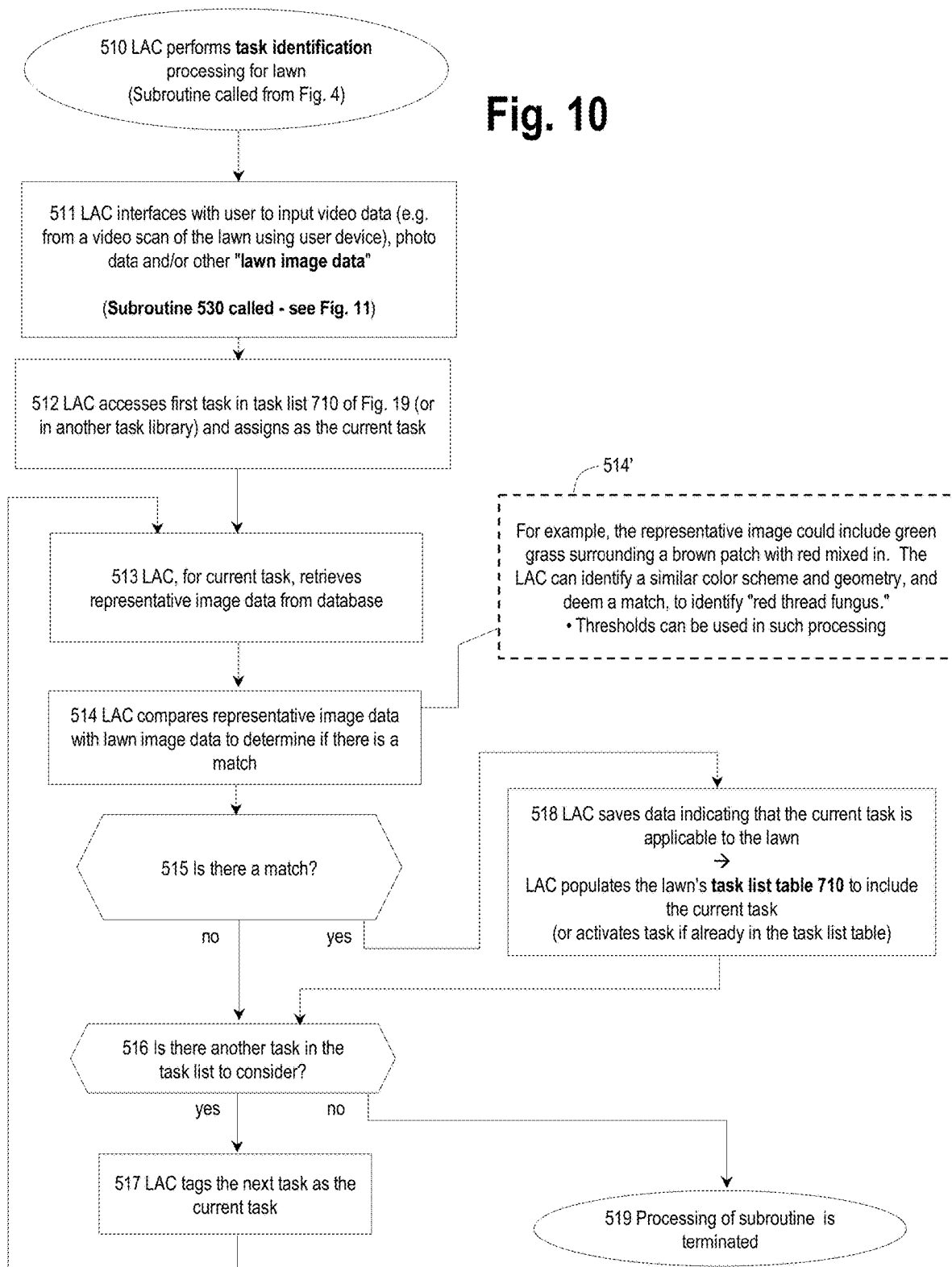
FIG. 10 is a flowchart showing details of "pod performs task identification processing for the lawn" of a subroutine, in accordance with principles of the disclosed subject matter.

FIG. 10 is a flowchart showing details of "LAC 110 performs task identification processing for the lawn" of subroutine 510. The subroutine can be called from the processing of FIG. 4 described above. The process is initiated and passes to step 511. In step 511, the LAC 110 interfaces with the user to input video data, photo data, or other lawn images or lawn image data. For example, video data could be input from a video scan of the lawn using a user device. The processing of FIG. 10 relates to a user providing lawn images, in the form of lawn image data, to the LAC 110. The LAC 110 can then perform a comparison with images in memory. If a match is determined, then a condition of the lawn can be identified.

In performing such processing, with further reference to FIG. 10, subroutine 530 can be called to input lawn image data from the user's lawn. Further details are described below with reference to FIG. 11.

After step 511, the process passes to step 512. In step 512, the LAC 110 accesses a first task in a task library. The LAC 110 assigns the first task is the current task.

Relatedly, FIG. 19 shows a task list table 710. As described above, in an embodiment, tasks in the task list table 710 can be tagged as active or not active. In one embodiment, only the active tasks would be presented to the user for consideration. The task list table 710 can function as a task library, herein referenced as task library 710L. Once a task is identified as needed for the lawn, the data record, in task list table 710, can be toggled from "Active=no" to "Active=yes". For example, once the processing of FIG. 10 identifies a task as needed, the LAC 110 can toggle the particular data record to active=yes. Alternatively, processing can be provided in which the user can review both active and not active tasks (in task list table 710) and manually toggle each task to either "Active=no" or "Active=yes", as desired by the user. For example, in table 710 (FIG. 19), the Perform_spring_cleanup_task (in data record 715) is populated with: Active=yes. However, the Perform_fall_cleanup_task (in data record 716) is populated with: Active=no.

Accordingly, the task list table 710 can function as a library of tasks that is associated with a particular user.

Alternatively, or additionally, a central task list library can be maintained that services a population of users. Such central task list library can be maintained on a central server so as to be available to a user population. The processing of step 512 (FIG. 10) can do a "sweep" of all available tasks and corresponding representative image(s) (in the central task list library) and determine if there is a match with images from the current lawn under consideration. If yes, i.e., a task is identified as required for a particular user's lawn, a data record can be created in task list table 710, to support such needed task.

Figure 20:
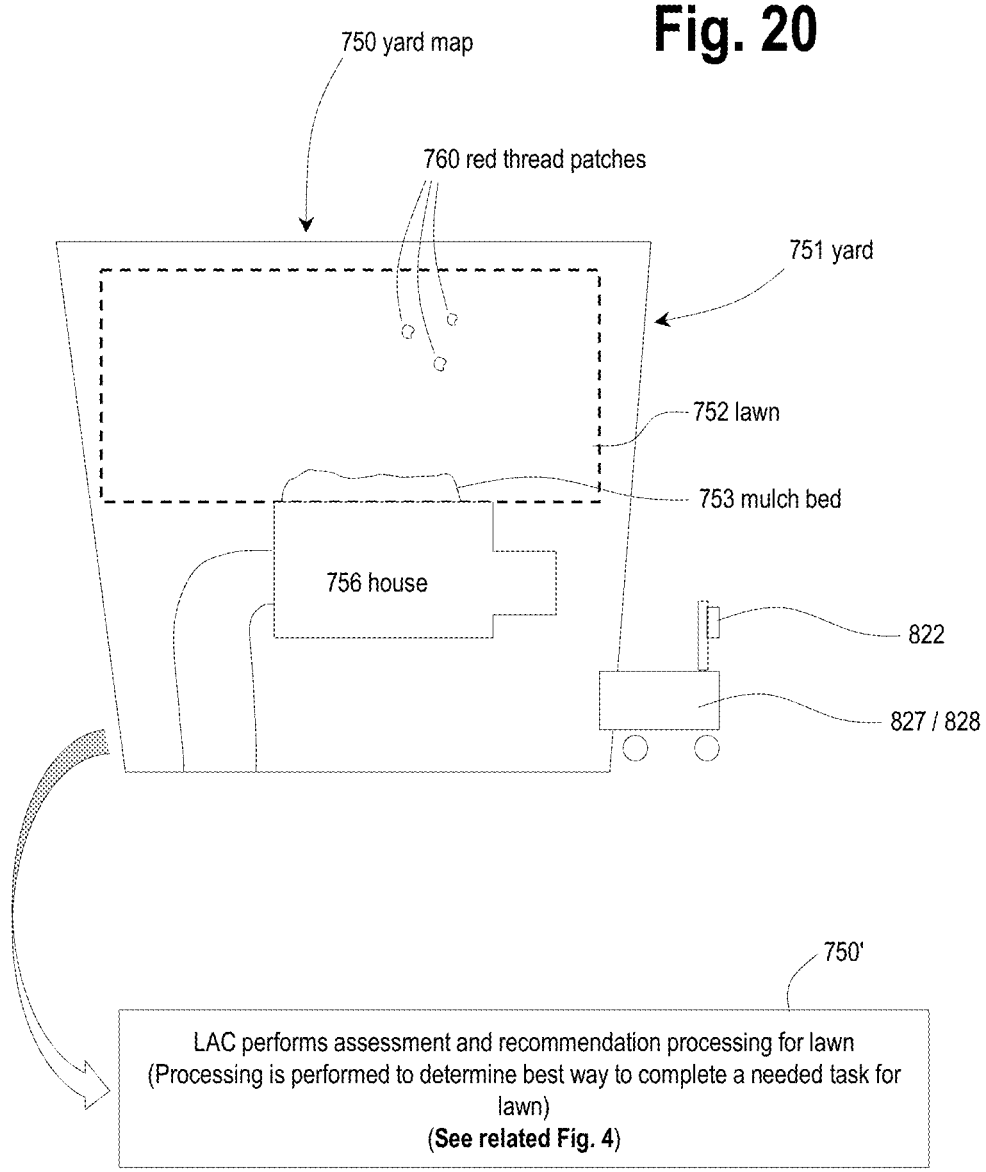
FIG. 20 is a schematic diagram of a yard map, in accordance with principles of the disclosed subject matter.

To further explain such features, and with further reference to FIG. 10, after step 512 the process passes to step 513. In step 513, the LAC 110 retrieves representative image data from the lawn care assessment database 124 or from some other data resource. Then, in step 514, the LAC 110 compares the representative image data against the lawn image data. The LAC 110 determines if there is a match. For example, as noted at 514', the representative image could include green grass surrounding a brown patch with red mixed in. The LAC can identify a similar color scheme and geometry, and deem a match—so as to identify red thread fungus. Illustratively, FIG. 20 shows a lawn 752 afflicted with red thread patches 760. Thresholds can be used in such processing—to compare the attributes of an input image versus the attributes of one or more images in a library of images. For example, RGB or other color values from the lawn image data could be determined, in a particular geometry, and the LAC determine if there is sufficient correspondence between the representative image data (representing a condition of the lawn) and the lawn image data.

After the comparison is performed in step 514, the process passes to step 515. That is, after the comparing of step 514, in step 515, the LAC 110 determines if there is a match. If yes in step 515, then the process passes to step 518.

In step 518, the LAC 110 saves data indicating that the current task under consideration is applicable to the lawn. The LAC 110 can populate the lawn's task list table to include the current task. For example, the task list table 710 shown in FIG. 19 can be updated, to include a task of perform disease control treatment. Alternatively, it is appreciated that all available tasks could be included in the task list table 710, but not activated. That is, upon a condition being identified in the lawn that warrants a task, then such corresponding task would be activated in the task list table 710.

After step 519 of FIG. 10, the process passes to step 516. Also, if a no is rendered in step 515, then the process passes to step 516. In step 516, the LAC 110 determines if there is another task in the task library to consider. That is, should the lawn image data that has been input from the user's lawn be compared with further representative image data (from a library of tasks).

If yes in step 516, then the process passes to step 517. In step 517, the LAC 110 tags the next task is the current task. Processing then passes back to step 513 and continues as described above.

Alternatively, a no may be rendered in step 516. Accordingly, the process passes to step 519 in which the subroutine is terminated.

It is of course appreciated that the task list of task list table 710 is merely illustrative, and that there are innumerable other tasks that could be processed in accordance with the disclosure. A task can be added to the task list 710 using the processing of FIGS. 10 and 11. Also, a user can interface with the LAC 110 so as to manually add a task to the task list 710 (i.e., for the user to interface with the LAC 110 to populate a data record in table 710) and/or manually select a task from the task list 710 for processing. That is, the systems and methods of the disclosure can be used to perform many other tasks, in addition to those listed in table 710. Such other tasks might include tree trimming, bush trimming, general cutting or trimming operations, expanding mulch beds, tree disease treatment, tree bug treatment, tasks relating to hardscape, applying a roller to a lawn or portion of a lawn to flatten or even out terrain, re-seeding tasks, sodding or resodding, applying lighting arrangements, integrating objects or constructs into a lawn such as a playset or shed, and other tasks that could be applied to a lawn, yard, or area, for example. Relatedly, various description set forth in this disclosure is provided in the context of a "lawn" and applying the systems and methods of the disclosure to a lawn. It is appreciated that the disclosure can be applied to any geographical area, for example.

Relatedly, for a given task, there can be many options to perform any given task. Accordingly, the disclosure can be directed to innumerable tasks and innumerable options to complete those tasks. As described herein, one type of task can be a DIY task that relates to a user performing work without outside help. Another type of task can be a service provider (SP) task that relates to a person or entity performing the task other than the homeowner, for example. However, some tasks could be a hybrid of a DIY task and a service provider task. Even more so, it is of course appreciated that for all of the innumerable possible options to complete tasks, there are many possible requirements associated with each of those options. Accordingly, it is appreciated that the requirements set forth in option requirement table 730 are only directed to the particular option described in options table 720, and in turn, the options table 720 is only directed to the particular detaching task represented in data record 712 (of task list table 710).

One requirement can be strength that is needed for a requirement, of an option. Such strength requirement is described, herein, in conjunction with the illustrative processing of FIG. 12. Any such requirement can be broken out into sub-requirements as may be desired. For example, a strength requirement may be broken out into components such as physical strength, cognitive strength, physical difficulty, cognitive difficulty, and/or difficulty in general. Relatedly, it is appreciated that some lawncare work may well require activities that are difficult on a user with back problems. That is, lawncare work can often involve leaning down or bending over to manipulate objects on the ground or to do work in proximity to the ground. Accordingly, profile data (such as is saved in the user attributes table 620) can identify different strength areas such as lower back strength, upper body strength, and physical endurance, for example. The requirements of an option (to perform a particular task) can be similarly broken out into different strength areas. This data can then be used to compare the strength of the user versus the strength required for a particular option. For example, applying a weed treatment using a backpack sprayer may not require the lower back strength as compared to laying sod. Accordingly, a strength requirement for applying a treatment with a backpack sprayer can be different than a strength requirement for laying sod over an area of lawn.

Figure 11:
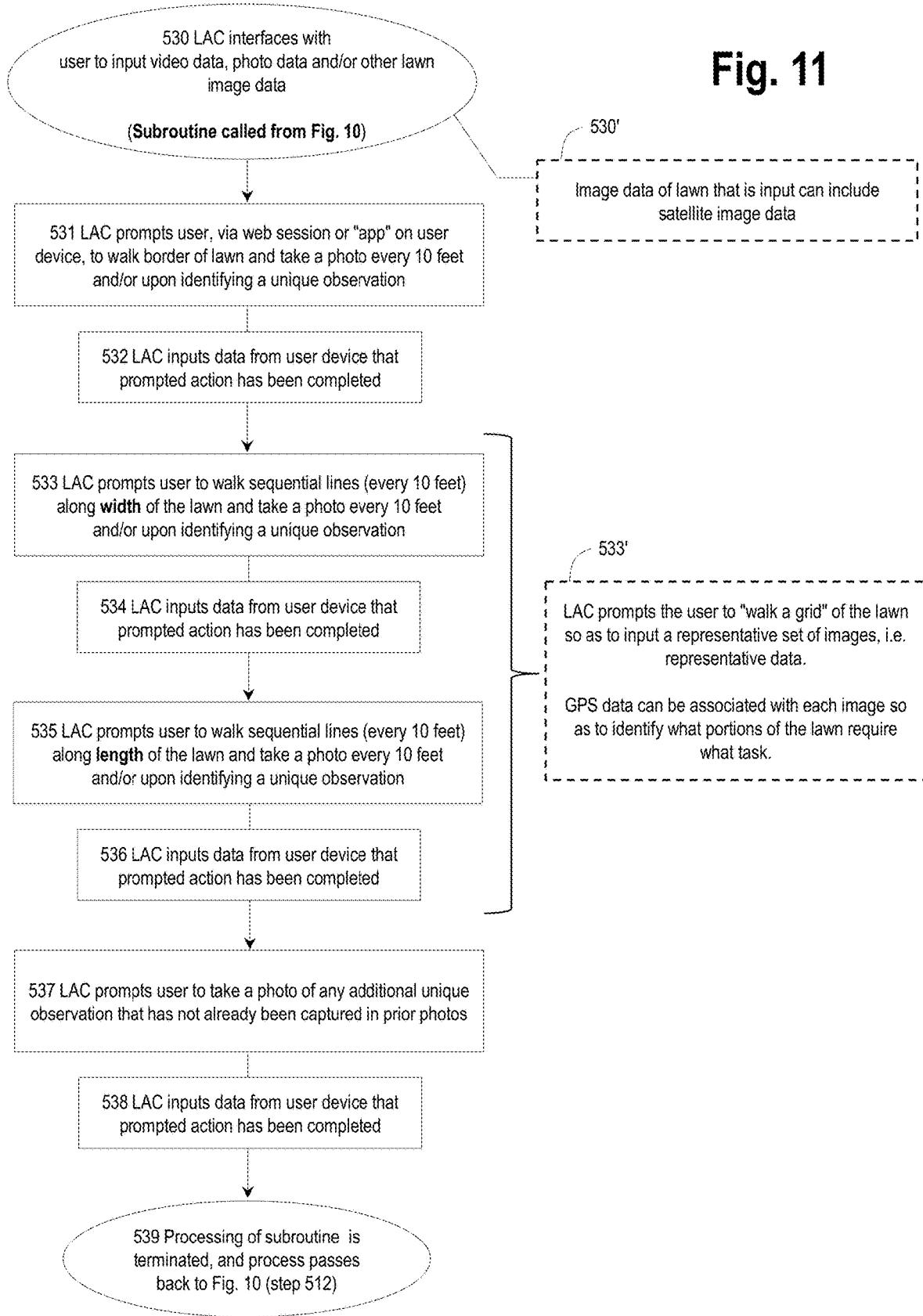
FIG. 11 is a flowchart showing "LAC interfaces with user to input video data, photo data and/or other lawn image data" of a subroutine, in accordance with principles of the disclosed subject matter.

FIG. 11 is a flowchart showing "LAC interfaces with user to input video data, photo data and/or other lawn image data" of subroutine 530, in accordance with principles of the disclosed subject matter. Subroutine 530 can be called from the processing of FIG. 10. As shown in FIG. 11, the process starts in step 530 and passes to step 531. As noted ay 530', in addition to images of the lawn being input by the user, various other sources of image data can be used. For example, satellite image data could be input to provide the amount of tree cover or foliage on the lawn, as well as to provide other data.

In step 531, the LAC 110 prompts the user, via web session or "app" on user device, to walk the border of the user's lawn and take a photo every 10 feet and/or upon identifying a unique observation. Then, in step 532, the LAC 110 inputs data from user device that the prompted action has been completed.

Then, in step 533, the LAC 110 prompts the user to walk sequential lines (every 10 feet) along width of the lawn and take a photo every 10 feet and/or upon identifying a unique observation. Then, in step 534, the LAC 110 inputs data from user device that the prompted action has been completed.

Then, in step 535, the LAC 110 prompts the user to walk sequential lines (every 10 feet) along the length of the lawn and take a photo every 10 feet and/or upon identifying a unique observation. Then, in step 536, the LAC 110 inputs data from the user device that the prompted action has been completed.

As noted at 533' of FIG. 11, the LAC can effectively prompt the user to "walk a grid" of the lawn (in steps 533 and 535) so as to input a representative set of images, i.e., representative data, to represent the lawn. Also, Global positioning system (GPS) data or other location data can be associated with each image. Such location data can be used by the LAC 110 so as to identify what portions of the lawn require what tasks.

With further reference to FIG. 11, after step 536, the process passes to step 537. In step, 537, the LAC 110 prompts the user to take a photo of any additional unique observation that has not already been captured in prior photos. Then, in step 538, the LAC 110 inputs data from the user device that the prompted action has been completed. Then, the process passes to step 539. In step 539, the processing of subroutine 530 is terminated, and process passes back to FIG. 10 (step 512).

FIG. 12 is a flowchart showing details of "LAC compares current requirement against corresponding parameter(s) in profile data to generate a rating score" of subroutine 550. The subroutine 550 can also include mapping the current requirement, being processed, to related information or content, such as online resources regarding a particular task at hand. Subroutine 550 can be called from the processing of FIG. 8.

The processing of FIG. 12 is initiated and passes to step 551. In this illustrative processing, in step 551, the LAC initiates processing for a current requirement, i.e., strength. That is, in this illustrative processing, the LAC 110 is processing the requirements of the option of data record 721 (i.e., DIY_dethatching_with_rake), of table 720 of FIG. 19. Such requirements are set forth in table 730, of FIG. 19, which is mapped to data record 721 of table 720.

In this example, the LAC 110 has already processed data records 732 and 733 (in prior iterations of subroutine 550), and generated respective rating scores, for the requirements represented in each of such data records 732 and 733. Each requirement may also have been mapped to respective content.

For the current requirement, i.e., strength, data record 734 (in FIG. 19) includes field 739. Field 739 is populated with a value of T1284, which is a tag or tag value, in accordance with an embodiment. Such tag allows for the LAC 110 to map the particular requirement to both (a) corresponding profile data, and (b) content data that is related to the particular requirement, such as online resources.

In step 552, the LAC 110 inputs data record 734 (of FIG. 19) that indicates that required strength is >6. Then, in step 553 the LAC, based on the tag T1284, identifies a strength attribute in the User_attributes_table 620 (of FIG. 15). That is, the LAC 110 maps to data record 621 of FIG. 15 based on the tag, T1284. As represented in the data record 621, the user's strength is 7. Such data can be input in the processing of step 313 of FIG. 5, as described above.

Then, in step 554, the LAC determines that there is good correspondence between required strength compared with user strength (in the profile data). That is, data record 734 indicates that required strength be greater than 6, and the user has input a strength of 7. Accordingly, in step 555, based on the good correspondence, the LAC assigns a rating score of 10/10, i.e., a very good score. As noted at 555A (FIG. 12), a rating score can be generated based on correspondence between requirement of task compared to profile data. The LAC 110 can match tags to determine which profile data is compared with which requirement.

Alternatively, as noted at 555B, if the user strength was 5 (in data record 621-FIG. 15), a much lower rating score would be awarded, in that user strength is not sufficient for the particular option Alternatively, as noted at 555C, if the user strength was 10 (in data record 621-FIG. 15), a slightly lower rating score (e.g., 8/10) would be awarded, in that there is a mis-match between needed strength and strength of the user. Correspondence, or lack of correspondence, between a requirement vis-à-vis profile data can be assigned a corresponding score in any manner as desired. in particular, correspondence between a requirement vis-à-vis profile data can be assigned a rating score based on a value differential between value required (by the requirement) versus value as represented in the corresponding profile data.

Accordingly, in the processing of step 555, the LAC 110 assigns a rating score to the current requirement, of data record 734 in table 730 of FIG. 19.

After step 555 of FIG. 12, the process passes to step 556. In step 556, the LAC 110 retrieves tags (T1627,T1629) from data record 734 (field 739') in table 730 of FIG. 19. As a result, the LAC 110 associates the current requirement with content identified by the tags T1627, T1629. That is, the LAC 110 maps the tags T1627, T1629 into content represented in data records 663 and 665, respectively, in Content_table 660 (FIG. 18). Such processing allows helpful content to be associated with the requirement based on comparison and/or matching of content tags.

As noted at 730' in FIG. 19, field 739 can contain tag(s) to map to profile data; and field 739' can contain tag(s) to map to content data. In some embodiments, fields 739 and 739' can be merged, and the processing can map to, and identify (a) profile data to assess the current requirement, and (b) content data that would be useful to the user in execution of the current requirement.

In some embodiments, a separate data record can be provided (in table 730) that is dedicated to contain tags, to map to content associated with the particular requirement. In such embodiments, the processing of FIG. 12 can be modified to include a processing mechanism to map to content data based on such separate data record. Other database architectures and arrangements can be used.

Accordingly, the Option_requirements_table 730 of FIG. 19 can include tags, associated with each requirement, to map to relevant content. Separate data record can be provided to map to content. Also, table 720, i.e., higher level table 720, can include tags (associated with relevant content) that relates to the option in general.

With further reference to FIG. 12, after step 556 of FIG. 12, the process passes to step 557. In step 557, the process returns to FIG. 8 (step 365 of FIG. 8).

As described above, further details of the data repository 120 are shown in FIG. 13, as well as in FIGS. 14-19. In particular, FIG. 13 shows database 124' which can be included in lawncare assessment database 124, in an embodiment. In some embodiments of the disclosure, the database 124' shown in FIGS. 13-19, and in particular the various data tables, can be stored in whole or in part in the user device 130. The database can be distributed between a central server database and the user device 130, in an embodiment. As described herein in detail, a particular option can be associated with a plurality of requirements that may be considered to assess the merits of such option. Such requirements might also be described as components of an option.

Accordingly, FIG. 13 is a schematic diagram of a database 124', in accordance with principles of the disclosed subject matter. Various features of the database of FIG. 13, as well as the database components of FIGS. 14-19, are described above.

The database 124' can include table 600, which can be described as yard table 600. The yard table 600 can include various data records. The yard table 600 can represent data associated with lawncare of an area, such as a lawn or other area. FIG. 20 is a schematic diagram of a yard map 750, in accordance with principles of the disclosed subject matter.

The data records of the yard table 600 can be linked to respective tables as shown in FIG. 13. That is, as noted at 600N in FIG. 13, each table in database 124', as well as tables in other databases, can include a primary key (PK) to identify the table. A foreign key (FK) can be an attribute in one table (entity) that links or maps to the PK of another table (entity), so as to provide an interrelationship or mapping between tables (entities).

Data record 601 contains a PK that can be used to identify the table 600, in the processing described herein. Data record 601 can be described as a primary key data record. Data records 602-609 can each be described as a content data records.

Data record 602, i.e., content data record 602, contains a FK that can be mapped to a primary key in Lawn_attributes_table 610.

Data record 603 contains a FK that can be mapped to a primary key in User_attributes_table 620.

Data record 604 contains a FK that can be mapped to a primary key in User_tool_table 630.

Data record 605 contains a FK that can be mapped to a primary key in Service_provider_table 650.

Data record 606 contains a FK that can be mapped to a primary key in Content_table 660.

Data record 607 contains a FK that can be mapped to a primary key in Yard_history_table 670.

Data record 608 contains a FK that can be mapped to a primary key in Lawn_images_table 680.

Data record 609 contains a FK that can be mapped to a primary key in Task_list_table 710.

As described herein, profile data 600', can include lawn attribute table 610, user attributes table 620, and various other data associated with the lawn and/or associated with the user, for example.

FIG. 14 is a schematic diagram that shows further details of database 124' including content of the Lawn_attributes_table 610. The table 610 can store various lawn attributes data, as otherwise described herein. The table 610 can include a plurality of data records 610DR, including data record 610PK. Data record 610PK can be a primary key data record that stores the PK for the table 610. Also, table 610 can contain various content data records. For example, data record 612 can be a content data record that stores data relating to the area of a lawn 752, with reference to FIG. 20. Each content data record can store respective data, as shown.

Each content data record, in table 610, can include data field 617, data field 618, and data field 619. Data field 617 can be populated with identification of the variable of the particular data record. Data field 618 can be populated with the value of the variable. Data field 619 can be populated with one or more tags that are used to map a particular data record 610DR to corresponding requirements of an option (to complete a task). For example, data record 612 can include the tag T1230. Such tag can be mapped to data record 733 (in option requirement table 730, of FIG. 19). That is, the size of the lawn is relevant to how long it will take to complete the option of data record 721 (in table 720 of FIG. 19).

As noted at 365', databases, data tables, data records, and other data stores can be expanded to include additional fields and data records as needed.

FIG. 15 is a schematic diagram that shows further details of database 124' including content of the User_attributes_table 620. The table 620 can store various user attributes data, as otherwise described herein. The table 620 can include a plurality of data records 620DR, including data record 620PK. Data record 620PK can be a primary key data record that stores the PK for the table 620. Also, table 620 can contain various content data records. For example, data record 621 can be a content data record that stores data relating to user strength. Each content data record can store respective data, as shown.

Each content data record, in table 620, can include data field 627, data field 628, and data field 629. Data field 627 can be populated with identification of the variable of the particular data record. Data field 628 can be populated with the value of the variable. Data field 629 can be populated with one or more tags, for each data record, that are used to map a particular data record 620DR to corresponding requirements of an option (to complete a task). For example, data record 621 can include the tag T1284. Such tag can be mapped to data record 734 (in option requirement table 730, of FIG. 19). Such processing is described above.

Figure 16:
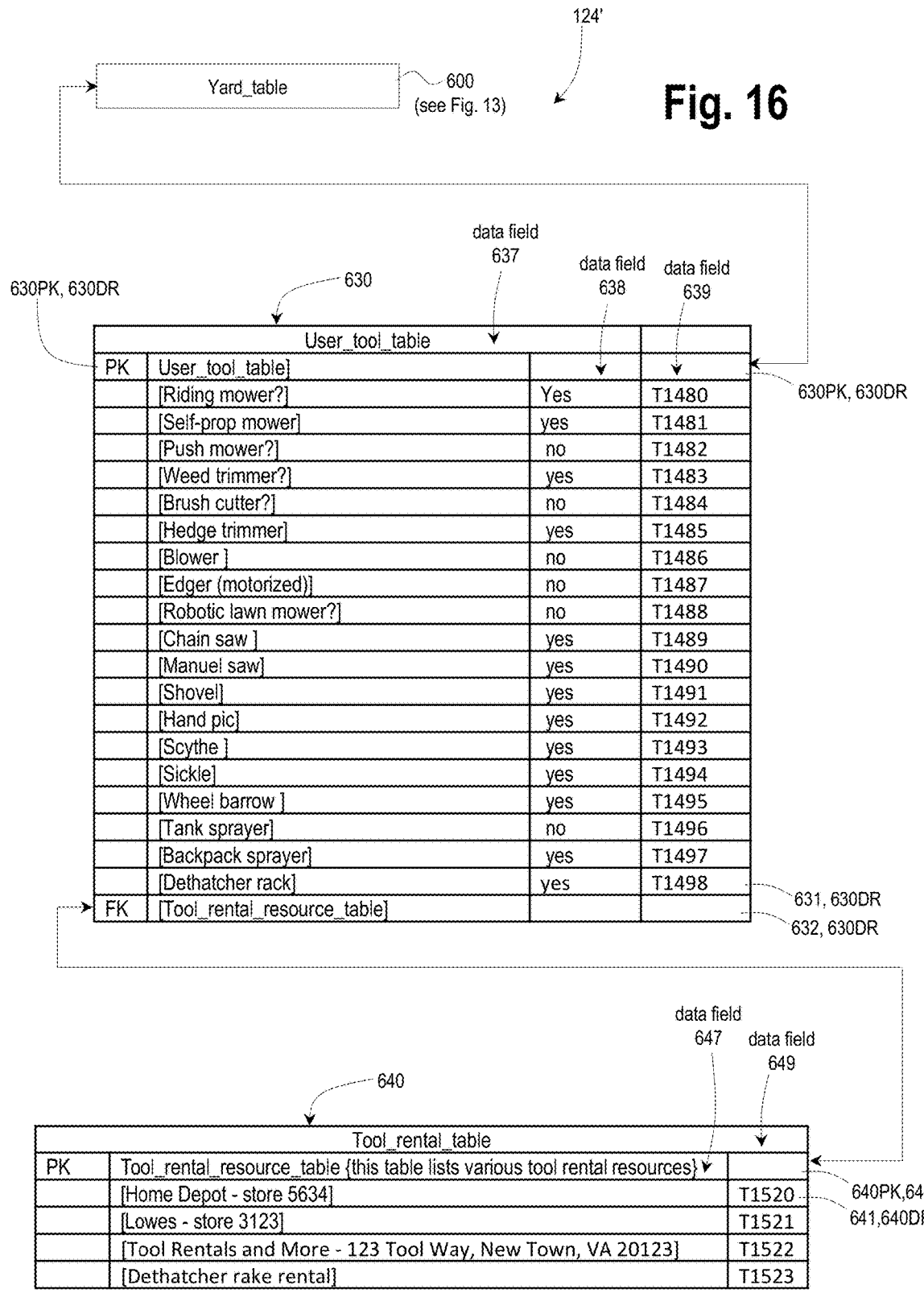
FIG. 16 is a schematic diagram that shows further details of the database of FIG. 13 including content of a user tool table, in accordance with principles of the disclosed subject matter.

FIG. 16 is a schematic diagram that shows further details of database 124' including content of the User_tool_table 630. The table 630 can store various user tool data, as otherwise described herein. The table 630 can include a plurality of data records 630DR, including data record 630PK. Data record 630PK can be a primary key data record that stores the PK for the table 630. Also, table 630 can contain various content data records. For example, data record 631 can be a content data record that stores data relating to whether the user owns a dethatching rake. Each content data record can store respective data, as shown.

Each content data record, in table 630, can include data field 637, data field 638, and data field 639. Data field 637 can be populated with identification of the variable of the particular data record. Data field 638 can be populated with the value of the variable. Data field 639 can be populated with one or more tags that are used to map a particular data record 630DR to corresponding requirements of an option (to complete a task). For example, data record 631 can include the tag T1498. Such tag can be mapped to data record 732 (in option requirements table 730, of FIG. 19). Such data allows the LAC 110 to assess, and assign an option score to, an option that the user/home owner dethatches his or her lawn using a dethatching rake. Such processing is described above.

As shown in FIG. 16, the User_tool_table 630 can include a FK data record 632 that contains a FK. The FK can map to Tool_rental_table 640. Such table 640 can list various tool rental resources.

More specifically, the table 640 can include a plurality of data records 640DR, including data record 640PK. Data record 640PK can be a primary key data record that stores the PK for the table 640. Also, table 640 can contain various content data records. Each content data record can store respective data, as shown.

Each content data record, in table 640, can include data field 647 and data field 649. Data field 647 can be populated with identification of the content of the particular data record. Data field 649 can be populated with one or more tags that are used to map a particular data record 640DR to corresponding requirements of an option (to complete a task). For example, data record 641 can include the key T1520.

To explain further, for example, data field 647 (in the tool rental table 640) can include the name of an entity that rents tools that could be used in lawncare work. Data field 649 can include a tag to map the data record to an option requirements table, such as table 730 of FIG. 19. For example, data record 641 (of table 640) could be linked to data record 732 (table 730 of FIG. 19) to provide rental options, if the user did not own a dethatching rake.

It is appreciated that each content data record, in table 640, can be further linked with additional data resources. For example, the Home Depot data record 641 can be linked to the Home Depot database so as to provide rental data to the LAC 110.

Figure 17:
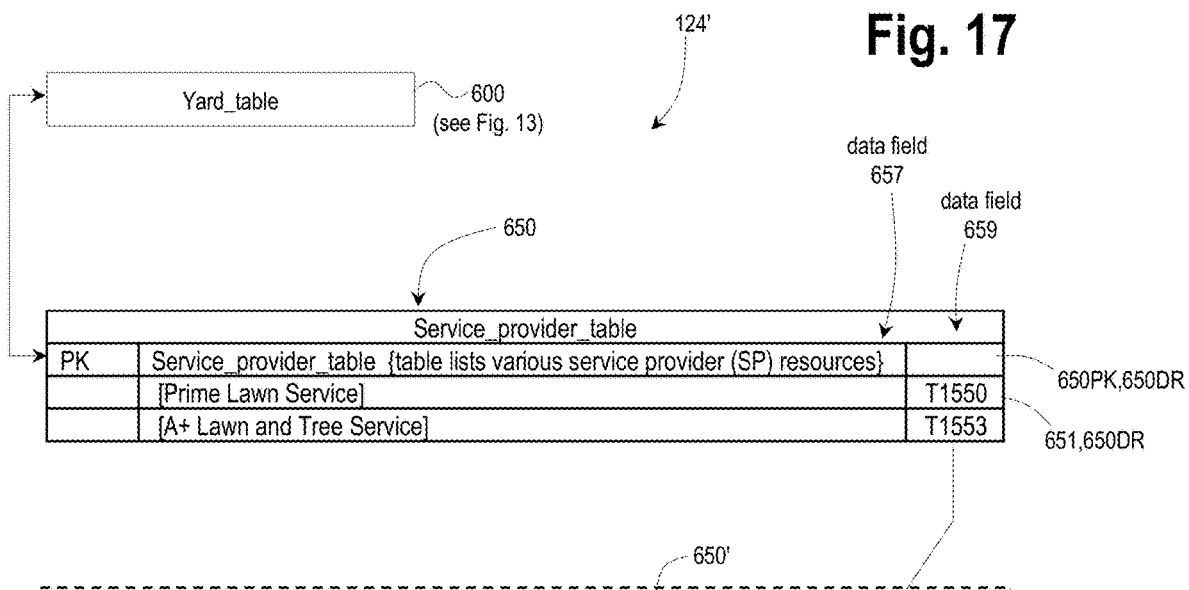
FIG. 17 is a schematic diagram that shows further details of the database of FIG. 13 including content of a service provider table, in accordance with principles of the disclosed subject matter.

FIG. 17 is a schematic diagram that shows further details of database 124' including content of the Service_provider_table 650. As shown in FIG. 17, Service_provider_table 650 can contain data relating to service providers. Service_provider_table 650 can be linked to the Yard_table 600, in database 124', as described above.

The table 650 can include a plurality of data records 650DR, including data record 650PK. Data record 650PK can be a primary key data record that stores the PK for the table 650. Also, data records 650DR, of table 650, can include various content data records. Each content data record can store respective data, as shown.

Each content data record, in table 650, can include data field 657 and data field 659. Data field 657 can be populated with identification of the content of the particular data record. Data field 659 can be populated with one or more tags that are used to map a particular data record 650DR to corresponding requirements of an option (to complete a task), as described herein. For example, data record 651 can include the tag T1550.

For example, data record 651 can include the name of an entity that provides lawncare services. Data field 659 (of data record 651) can include the tag (T1550) to map the data record 651 to an option requirements table, such as table 730 of FIG. 19, as related to a requirement (of an option) that requires a service provider. It is appreciated that each content data record, in table 650, can be further linked with additional data resources.

As noted at 650' in FIG. 17, using the processing of FIG. 12, rating score(s) can be generated based on cost and budget. For example, a rating score can be generated for each requirement of the Hire_SP_1 option (shown in data record 725 (table 720) of FIG. 19). One of the requirements (of the Hire_SP_1 option) can be funds, and such requirement can be compared to data record 623 of FIG. 15 (in User_attributes_table 620). Different service providers (SPs) can be considered, as listed in table 650 (FIG. 17), and each of such SPs can be mapped (in the database) to additional data regarding cost estimate data for various lawn tasks. If cost is prohibitive, the particular option can be eliminated as not viable. Cost can be deemed prohibitive if it exceeds cost thresholds in the profile data. If cost is not prohibitive, the LAC can input and/or access data regarding bids (or cost estimates) of each vendor, and such bids can then be assessed and compared.

FIG. 18 is a schematic diagram that shows further details of database 124' including content of the Content_table 660. As shown in FIG. 18, Content_table 660 can contain data relating to various web or Internet resources and/or other information that might be relevant to the particular task, option to complete a task, or requirement for an option under consideration.

The Content_table 660 can be linked to the Yard_table 600, in database 124', as described above.

The table 660 can include a plurality of data records 660DR, including data record 660PK. Data record 660PK can be a primary key data record that stores the PK for the table 660. Also, data records 660DR, of table 660, can include various content data records. Each content data record can store respective data, as shown.

Each content data record, in table 660, can include data field 667 and data field 669. Data field 667 can be populated with identification of the content of the particular data record. Data field 669 can be populated with one or more tags that are used to map a particular data record 660DR to corresponding requirements of an option (to complete a task), as described herein.

For example, data record 664 can include identification of content, [YouTube video on sharpening mower blades]. Data field 669 (of data record 664) can include a tag to map the data record 664 to an option requirements table, such as table 730 of FIG. 19, as related to a requirement (of an option). It is appreciated that each content data record, in table 660, can be further linked with additional data resources. The various "tags" as described herein, to associate, map or link content, might also be described as "keys", though not to be confused with primary keys and secondary keys, as described herein.

FIG. 19 is a schematic diagram that shows further details of database 124' including content of the Task_list_table 710, Options_for_task_table 720, and Option_requirements_table 730. Various processing related to the data of tables 710, 720, and 730 is described throughout this disclosure.

The Task_list_table 710 can provide a task list, as described above. The Task_list_table 710 can be
maintained in database 124', in the user device 130, and/or in some other data store or database. Accordingly, the Task_list_table 710, as well as tables 720 and 730, can be distributed over different data resources.

The Task_list_table 710, i.e., table 710, can include a plurality of data records 710DR, including PK data record 710PK. PK data record 710PK can be a primary key data record that stores the PK for the table 710. The PK in the Task_list_table 710 can be linked to Yard_table 600, as described above.

The data records 710DR can also include content data records. Each content data record, in table 710, can include data field 717, data field 718, and data field 719. Data field 717 can be populated with a FK for the particular data record. Data field 718 can include identification of a task. Data field 719 can be populated with a value that indicates whether the particular task is active or not active.

The content data records of table 710 are populated with tasks that can be applied to the lawn. As noted above, data field 717 can be populated with an FK for each task. The FK for each task can be linked to a PK in a corresponding table. Such corresponding table can contain options to perform the particular task. For example, as described above, the dethatching task of data record 712 (in table 710) can be linked to the PK in data record 720PK (in options table 720). Accordingly, the "task" of data record 712 is linked to a plurality of options (in table 720) for performing the task.

Accordingly, the options table 720 includes data records 720DR. The data records 720DR can include PK data record 720PK, to map to table 710. The data records 720DR can also include content data records that are populated with the various options (for the task of data record 712 in table 710).

The content data records can include data field 727 and data field 728. Each data field 728 can be populated with identification of an option that might be used to complete the task (of data record 712). The data field 727 can be populated with an FK for each content data record. The FK can map to a respective Option_requirements_table 730. Such table 730 can include the various requirements that are associated with the option of data record 721 (of table 720), i.e., which is one of the options listed in table 720.

Accordingly, the Option_requirements_table 730 includes data records 730DR. The data records 730DR can include PK data record 730PK, to map to the higher level Options_for_task_table 720. The PK can be in data field 737. The data records 720DR can also include content data records that are populated with the various requirements (for the option of data record 721 in table 720). The content data records can include data field 738, data field 739, and data field 739'. Each data field 738 can be populated with identification of a requirement that is needed to complete the task (of data record 721).

As noted at 730' in FIG. 19 (and also described above), data field 739 can contain tag(s) to map to profile data; and data field 739' can contains tag(s) to map to content data. As described above, as reflected at 710', other data records (in table 710) with FKs can be mapped to corresponding options_for_task table, in similar manner to the way that data record 712 is mapped. As reflected at 720', other data records (in table 720) with FKs (foreign keys) can be mapped to corresponding option_requirements table, in similar manner to the way that data record 721 is mapped.

FIG. 20 is a schematic diagram of a yard map 750, in accordance with an embodiment. As shown, the yard map 750 can display attributes of a yard 751. The yard 751 can include a lawn 752. The yard can also include a mulch bed 753. The yard map 750 also shows a hell 756. The lawn 752 can be processed with the various functionality and features described herein. As noted at 750', the LAC 110 can perform assessment and recommendation processing for the lawn 752. For example, processing can be performed to determine a best way to complete a needed task for the lawn. Further details are described above with reference to FIG. 4 and described throughout this disclosure. Illustratively, the lawn 752 is shown as being afflicted with the red thread patches 760. As described above, various processing of the disclosure can identify the presence of red thread, generate a task to address such red thread, and process various candidate options (including the requirements of each option). Information regarding each option can then be presented to the user, and in particular a score associated with each option can be presented to the user. Additionally, various resources and other content can be presented to the user to assist in the needed task of treating such condition of the lawn. For example, a DIY option for treating red thread and a service provider option for treating red thread can be generated and displayed to the user.

FIG. 21 is a schematic diagram of a user device 130 displaying a graphical user interface (GUI) 800, in accordance with principles of the disclosed subject matter. The GUI 800 can be provided to interface with the user to input and output various information from the user, to perform lawncare assessment processing.

The GUI 521 can include a text field 801 by which a user can input an address for the service. Relatedly, a text field 802 can be used to input the identification of a lawn section or other area for service. For example, the field 802 could identify the lawn 752 of the yard 751, shown in FIG. 20. Accordingly, a single address can have different sections or lawn sections that are treated differently.

The GUI 800 can be provided to access various functionality as described herein. Also, as otherwise described herein, the processing components and/or database components of the processing device 100, shown in FIG. 3, can be installed or disposed in the user device 130. Processing and database resources can be distributed amongst the user device, a central server, and other processing entity.

The GUI 800 of FIG. 21 shows illustrative functionality as described in the present disclosure. However, it is appreciated that the GUI 800 of FIG. 21 is merely illustrative, and many other functionalities as described herein could also be represented or accessed via the GUI 800.

The GUI includes button 803. The user can tap the button 803 to access a task list for a location. For example, the user might tap the button 803 and, in response, the user device 130 display a listing of tasks with the content shown in the task list table 710, as shown in FIG. 19.

The GUI 800 can also include window 810. The user can tap button 811 in window 810 so as to change what options are displayed for a particular task. The user can choose to show or not show DIY options. The user can choose to show or not show service provider options. The selection of such options can dictate the processing of step 382 and step 384 (FIG. 9) as described above.

The GUI 800 also includes window 814. The window 814 is provided so that the user can interface with the system to indicate that the user wants to do a walkabout of the lawn, so as to enter images from the lawn. Accordingly, the user might tap button 8014 to initiate the processing shown in FIG. 10 and/or shown in FIG. 11.

The GUI 800 can also include window 816. Illustratively, an example of dethatching a lawn is described above. Window 816 can display scores associated with options to detach the lawn. As shown, the DIY option was assigned a score of 87. The service provider option was assigned a score of 85. Accordingly, the DIY option is slightly favored over the service provider option.

The user device 130 can include known features, such as a sensor 822 (e.g., camera, radar, Lidar, GPS sensor, GNSS sensor, satellite sensor, etc.), a speaker 823, a microphone 824, menu options 525, and other known features.

As described herein, in at least some embodiments of the system of the disclosure, various processes are described as being performed by one or more computer processors. Such one or more computer processors can, in conjunction with a database or other data storage mechanism, provide and/or constitute a "processing machine," i.e., a tangibly embodied machine, in that such one or more computer processors can include various physical computing devices as otherwise described herein, various support structure to physically support the computing devices, other hardware, and other physical structure, for example. In embodiments, a processing machine of the disclosure can include one or more computer processors and one or more databases that are in communication with the one or more computer processors. A computer processor or processing machine of the disclosure can be part of a higher level system or apparatus.

As used herein, the term "computer processor" can be understood to include at least one processor that uses at least one memory. The at least one memory can store a set of instructions. The instructions may be either permanently or temporarily stored in the memory or memories of the processing machine or associated with the processing machine. The computer processor can execute the instructions that are stored in the memory or memories in order to process data, input data, output data, and perform related processing. The set of instructions may include various instructions that perform a particular task or tasks, such as any of the processing as described herein. Such a set of instructions for performing a particular task may be described as a program, software program, code or simply software. Accordingly, various processing is described herein as performed by a computer processor (CP). Such computer processor (CP) can be described as or can include: a computer processor portion, a computer processing portion, a processor, a system processor, a processing system, a server, a server processing portion, an engine, a processing engine, a central processing unit (CPU), a controller, a processor-based controller, an electronic computing device, an apparatus controller, an apparatus computer processor, a processing device, a computer operating system, an apparatus processing portion, an apparatus processing portion, an electronic control unit ("ECU"), a microcontroller, a microcomputer, a plurality of electronic computing devices or servers, other processor-based controller(s), and/or similar constructs, for example.

A computer processor and/or processing machine, of the disclosure, may be constituted by and/or be part of particular apparatus(es), system(s) and/or device(s) described herein. The computer processor can execute instructions that are stored in memory or memories to process data. This processing of data may be in response to commands by a user or users of the computer processor, in response to previous processing, in response to a request by another processing machine and/or any other input, for example. A user can be in the form of a user device, such as a cellular phone.

A computer processor and/or processing machine of the disclosure may also utilize (or be in the form of) any of a wide variety of technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that can be capable of implementing the steps of the processes of the disclosure.

The computer processor and/or processing machine used to implement the disclosure may utilize a suitable operating system. Thus, embodiments of the disclosure may include a processing machine running the Windows 11 operating system, the Windows 10 operating system, the Windows 8 operating system, Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the disclosure as described herein, it is not necessary that the computer processors and/or the memories of a processing machine be physically located in the same geographical place. That is, each of the computer processors and the memories used by the processing machine may be located in geographically distinct locations and connected so as to communicate in any suitable manner. Additionally, it is appreciated that each computer processor and/or the memory may be composed of different physical pieces of equipment. Accordingly, it is not necessary that a processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above can be performed by various components and various memories. However, it is appreciated that the processing performed by two distinct components as described herein may, in accordance with a further embodiment of the disclosure, be performed by a single component. Further, the processing performed by one distinct component as described above may be performed by two distinct components. For example, processing as described herein might be performed in part by a system or other system or server, in part by some third party resource, and in part by a user device. In a similar manner, the memory storage performed by two distinct memory portions as described herein may, in accordance with a further embodiment of the disclosure, be performed by a single memory portion. Further, the memory storage performed by one distinct memory portion as described above may be performed by two memory portions.

Further, as described herein, various technologies may be used to provide communication between the various processors and/or memories, as well as to allow the processors and/or the memories of the disclosure to communicate with any other entity; i.e., so as to obtain further instructions, transfer data, or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described herein, a set of instructions can be used in the processing of the disclosure on the processing machine, for example. The set of instructions may be in the form of a program or software. The software may be in the form of a system software or application software, for example. The software might also be in the form of a collection of separate programs, a program module within a larger program, or a portion of a program module, for example. The software used might also include modular programming in the form of object oriented programming. The software tells the processing machine what to do with the data being processed.

It is appreciated that the instructions or set of instructions used in the implementation and operation of features of the disclosure may be in a suitable form such that a computer processor or processing machine may read the instructions. For example, the instructions that form a program may be in the form of a suitable programming language, which can be converted to machine language or object code to allow the processor or processors to read the instructions. That is, written lines of programming code or source code, in a particular programming language, can be converted to machine language using a compiler, assembler or interpreter. The machine language can be binary coded machine instructions that are specific to a particular type of processing machine, i.e., to a particular type of computer processor, for example. The computer processor understands the machine language.

Accordingly, a suitable programming language may be used in accordance with the various embodiments of the disclosure. Illustratively, the programming language used may include assembly language, Ada, APL, Basic, C, C++, COBOL, dBase, Forth, Fortran, Java, Modula-2, Pascal, Prolog, REXX, Visual Basic, Python, Ruby, PHP, Perl, JavaScript, and/or other scripting language, for example. Further, it is not necessary that a single type of instructions or single programming language be utilized in conjunction with the operation of the systems and methods of the disclosure. Rather, any number of different programming languages may be utilized as may be necessary or desirable.

Also, the instructions and/or data used in the practice of the disclosure may utilize any compression or encryption technique or algorithm, as may be desired. An encryption module might be used to encrypt data. Further, files or other data may be decrypted using a suitable decryption module, for example. Accordingly, a compression or encryption technique or algorithm can be used that transforms the data from an un-encrypted format to an encrypted format.

As described above, the disclosure may illustratively be embodied in the form of a processing machine, including a computer processor, for example, that includes at least one memory. It is to be appreciated that the set of instructions, i.e., the software for example, that enables the computer processor to perform the operations described herein may be contained on any of a wide variety of media or medium, as desired. Further, the data that can be processed by the set of instructions can be contained on any of a wide variety of media or medium. That is, the particular medium, i.e., the memory or data storage device used in a processing machine, utilized to hold the set of instructions and/or the data used in practice of the disclosure may take on any of a variety of physical forms or transmissions, for example. Illustratively, the medium or data storage device may be in a tangibly embodied form of paper, paper transparencies, a compact disk, a DVD, an integrated circuit, a hard disk, a floppy disk, an optical disk, a magnetic tape, a RAM, a ROM, a PROM, a EPROM, a CD-ROM, a DVD-ROM, a hard drive, a magnetic tape cassette, a wire, a cable, a fiber, communications channel, and/or may be in the form of a satellite transmissions or other remote transmission, as well as any other medium or source of data that may be read by the processors of the disclosure.

For example, exemplary embodiments are intended to cover all software or computer programs capable of enabling processors to implement the operations, designs and determinations as described herein. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed herein.

These computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages.

Some of the disclosed embodiments include or otherwise involve data transfer over a network, such as communicating various inputs and outputs over the network. The network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. Network may include multiple networks or subnetworks, each of which may include, for example, a wired or wireless data pathway. A network may include a circuit-switched voice network, a packet-switched data network, or any other network able to carry electronic communications. For example, the network may include networks based on the Internet protocol (IP) or asynchronous transfer mode (ATM), and may support voice using, for example, VoIP, Voice-over-ATM, or other comparable protocols used for voice data communications. In one implementation, the network includes a cellular telephone network configured to enable exchange of text or SMS messages.

Examples of a network include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and so forth.

The database(s), memory or memories used in the processing machine that implements the disclosure may be in any of a wide variety of forms to allow the memory to hold instructions, data, or other information, as can be desired. Thus, a memory might be in the form of a database to hold data. The database might use any desired arrangement of files or data sets such as a flat file arrangement or a relational database arrangement, for example. The database can include any number of data records, tables, and/or other data structure. A table in a database can include a Primary key (PK) to identify the table. A foreign key (FK) can be an attribute in one table (entity) that links or maps to the PK of another table, so as to provide an interrelationship or mapping between tables and/or databases, for example.

In various processing described herein and illustrated by flowcharts or otherwise described, variables can be used in various processes. Such processes can include routines, subroutines, and steps, for example. The various variables can be passed between processes as may be needed in accord with the instructions provided to a processor. The various variables can be global variables that are available to the various processes, such as between a calling process and a subroutine, for example.

In the system and method of the disclosure, a variety of "user interfaces" may be utilized to allow a user to interface with the processing machine or machines that are used to implement the disclosure. As used herein, a user interface can include any hardware, software, or combination of hardware and software used by the processing machine that allows a user to interact with the processing machine and/or computer processor. A user interface may be in the form of a dialogue screen for example. A user interface may also include any of a mouse, touch screen, keyboard, voice reader, voice recognizer, dialogue screen, menu box, list, checkbox, toggle switch, a light, a pushbutton or any other device that allows a user to receive information regarding the operation of the processing machine as the processing machine processes a set of instructions and/or provide the processing machine with information. Accordingly, the user interface can be any device that provides communication between a user and a processing machine and/or computer processor. The information provided by the user to the processing machine through the user interface may be in the form of a command, a selection of data, or some other input, for example.

A user interface of the disclosure can be provided by or in the form of a user device or electronic user device. Also, systems of the disclosure can include or be in communication with one or more user devices that serve to interact or interface with a human user. A user device can be any appropriate electronic device, such as a cellular (mobile) telephone, smart phone, a tablet computer, a laptop computer, a desktop computer, an e-reader, an electronic wearable, smartwatch, gaming console, personal digital assistant (PDA), portable music player, fitness trackers with smart capabilities, and/or a server terminal, for example.

Such a user device can permit a user to input requests for information, output information, and/or process data. A user device can be in the form of and/or include a computer processor and/or a processing machine, as described herein.

As discussed above, a user interface can be utilized by the processing machine, which performs a set of instructions, such that the processing machine processes data for a user. The user interface can be typically used by the processing machine for interacting with a user either to convey information or receive information from the user. However, it should be appreciated that in accordance with some embodiments of the systems and methods of the disclosure, it is not necessary that a human user actually interact with a user interface used by the processing machine of the disclosure. Rather, it is also contemplated that the user interface of the disclosure might interact, i.e., convey and receive information, with another processing machine, rather than a human user. Accordingly, the other processing machine might be described as a user. Further, it is contemplated that a user interface utilized in the systems and methods of the disclosure may interact partially with another processing machine or processing machines, while also interacting partially with a human user.

Features as disclosed herein may be described in context of particular units or dimensions. It is appreciated that alternative units or dimensions can be used as desired. Additionally, conversion can be performed between units or dimensions as may be desired.

In this disclosure, quotation marks, such as with the language "computer processor", have been used to enhance readability and/or to parse out a term or phrase for clarity.

It will be appreciated that features, elements and/or characteristics described with respect to one embodiment of the disclosure may be variously used with other embodiments of the disclosure as may be desired.

It will be appreciated that the effects of the present disclosure are not limited to the above-mentioned effects, and other effects, which are not mentioned herein, will be apparent to those in the art from the disclosure and accompanying claims.

Although the preferred embodiments of the present disclosure have been disclosed for illustrative purposes, those skilled in the art will appreciate that various modifications, additions and substitutions are possible, without departing from the scope and spirit of the disclosure and accompanying claims.

As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, process step, region, layer or section from another region, layer or section. Thus, a first element, component, process step, region, layer or section could be termed a second element, component, process step, region, layer or section without departing from the teachings of the present disclosure.

Spatially and organizationally relative terms, such as "lower", "upper", "top", "bottom", "left", "right", "north", "south", "east", "west", "up", "down", "right", "left", "upper threshold", "lower threshold" and the like, may be used herein for ease of description to describe the relationship of one element or feature to another element(s) or feature(s) as illustrated in the drawing figures. It will be understood that spatially and organizationally relative terms are intended to encompass different orientations of or organizational aspects of components in use or in operation, in addition to the orientation or particular organization depicted in the drawing figures. For example, if a device or apparatus in the drawing figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein should be interpreted accordingly.

Embodiments are also intended to include or otherwise cover methods of using and methods of manufacturing any and all of the elements disclosed above.

As used herein, "data" and "information" have been used interchangeably.

The terminology used herein is for the purpose of describing particular embodiments only and is not intended to be limiting of the disclosure. As used herein, the singular forms "a", "an" and "the" are intended to include the plural forms as well, unless the context clearly indicates otherwise.

It will be further understood that the terms "comprises" and/or "comprising," when used in this specification, specify the presence of stated features, integers, process steps, operations, elements, and/or components, but do not preclude the presence or addition of one or more other features, integers, process steps, operations, elements, components, and/or groups thereof.

Embodiments of the disclosure are described herein with reference to diagrams, flowcharts and/or other illustrations, for example, that are schematic illustrations of idealized embodiments (and intermediate components) of the disclosure. As such, variations from the illustrations are to be expected. Thus, embodiments of the disclosure should not be construed as limited to the particular organizational depiction of components and/or processing illustrated herein but are to include deviations in organization of components and/or processing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, as otherwise noted herein, when a particular feature, structure, or characteristic is described in connection with any embodiment, it is submitted that it is within the purview of one skilled in the art to effect and/or use such feature, structure, or characteristic in connection with other ones of the embodiments.

While the subject matter has been described in detail with reference to exemplary embodiments thereof, it will be apparent to one skilled in the art that various changes can be made, and equivalents employed, without departing from the scope of the disclosure.

All references and/or documents referenced herein are hereby incorporated by reference in their entirety.

It will be readily understood by those persons skilled in the art that the present disclosure is susceptible to broad utility and application. Many embodiments and adaptations of the present disclosure other than those herein described, as well as many variations, modifications and equivalent arrangements, will be apparent from or reasonably suggested by the present disclosure and foregoing description thereof, without departing from the substance or scope of the disclosure.

Accordingly, while the present disclosure has been described here in detail in relation to its exemplary embodiments, it is to be understood that this disclosure is only illustrative and exemplary of the present disclosure and is made to provide an enabling disclosure of the disclosure. Accordingly, the foregoing disclosure is not intended to be construed or to limit the present disclosure or otherwise to exclude any other such embodiments, adaptations, variations, modifications and equivalent arrangements.

What is claimed is:

1. A system to assess lawncare conditions for an area at a geographical location, the system including a tangibly embodied computer processor (CP) and a tangibly embodied database, the CP implementing instructions on a non-transitory computer medium disposed in the database, and the database in communication with the CP, the system comprising:
   a communication portion for providing communication between the CP and a user device;
   the database that includes the non-transitory computer medium, and the database including the instructions; and
   the CP, and the CP performing processing including:
      accessing task data regarding a task to be applied to the area;
      accessing profile data associated with the area;
      mapping, based on the task data, to first data regarding a first candidate option to be considered for performance of the task, the first data including DIY (do-it-yourself) related data, regarding the user performing the task;
      mapping, based on the task data, to second data regarding a second candidate option to be considered for performance of the task, the second data including service provider (SP) related data, regarding an external party performing the task;
      generating a first option score, for the first candidate option, based on the profile data and the first data;
      generating a second option score, for the second candidate option, based on the profile data and the second data;
      performing score processing, including processing the first option score and the second option score, and the performing score processing including determining that the first option score is favored over the second option score;
      saving in the database, based on the determining, recommendation data that the first candidate option is preferred;
      mapping, based on the task data, to automation data regarding an automation option to be considered for performance of the task, the automation data including information relating to automated tasks and manual tasks; and generating an automation option score based on the automation data and at least one of the first data and second data, wherein the performing score processing includes processing the automation option score and determining that automation of the task is preferred over manual performance of the task.

2. The system of claim 1, the area is a lawn.

3. The system of claim 1, the profile data includes at least one selected from the group consisting of (1) area attribute data that includes data regarding condition of the area, and (2) user attribute data including data regarding the user.

4. The system of claim 1, the profile data includes (1) area attribute data that includes data regarding condition of the area, and (2) user attribute data including data regarding the user.

5. The system of claim 1, CP performing processing further including identifying a condition of the area, and, based on the condition, identifying the task, the condition of the area including at least one selected from the group consisting of: a disease in grass in the area, an insect condition in the area; a fertilizer condition in the area, an overgrowth condition in the area, a runoff condition in the area, and a nutrient condition in the area.

6. The system of claim 1, the CP performing further processing including:
providing information to the user via the user device, the information including at least a set of do-it-yourself (DIY) related data regarding the user performing the task, and a set of service provider (SP) related data regarding an external third party performing the task,
the DIY related data including at least one of DIY cost, DIY product recommendation, DIY ingredient recommendation, DIY ingredient availability, DIY product availability, and DIY environmental impact information, and
the SP related data including at least one of SP cost, SP product recommendation, SP ingredient recommendation, SP availability, and SP environmental impact information.

7. The system of claim 1, the performing processing further including:
generating a third option score, for a third candidate option, based on the profile data and third data; and
generating a fourth option score, for a fourth candidate option, based on the profile data and fourth data.

8. The system of claim 7, the performing score processing including:
determining that the first option score and the second option score satisfy a threshold value; and
determining that the third option score, and the fourth option score do not satisfy a threshold value.

9. The system of claim 1, further comprising:
a sensor selected from the group consisting of a camera, a radar sensor, a global positioning system sensor, a global navigation satellite system sensor, an inertial measurement unit sensor, a moisture sensor, a nutrient sensor, and a Lidar sensor, wherein the sensor is configured to provide at least a portion of the profile data to the system.

10. The system of claim 9, further comprising:
at least one of a lawn tool upon which the sensor is mounted and a lawn machine upon which the sensor is mounted.

11. The system of claim 1, the generating a first option score includes:
accessing and processing a plurality of requirements linked to the first candidate option, for performing the task.

12. The system of claim 11, the generating the first option score includes:
determining a respective rating score for each of the plurality of requirements; and
aggregating the rating scores to generate the first option score.

13. The system of claim 11, the plurality of requirements linked to the first candidate option includes:
first requirement data related to difficulty of the first candidate option;
second requirement data related to time needed for the first candidate option; and
third requirement data related to equipment needed for the first candidate option.

14. The system of claim 11, the plurality of requirements linked to the first candidate option includes:
first requirement data related to environmental impact of the first candidate option; and
second requirement data related to cost of the first candidate option.

15. A user device hosting an installed system to assess lawncare conditions for an area at a geographical location, the system including a tangibly embodied computer processor (CP) and a tangibly embodied database, the CP implementing instructions on a non-transitory computer medium disposed in the database, and the database in communication with the CP, the user device comprising:
a communication portion for providing communication between the CP and external processors;
the database that includes the non-transitory computer medium, and the database including the instructions; and
the CP, and the CP performing processing including:
accessing task data regarding a task to be applied to the area;
accessing profile data associated with the area;
mapping, based on the task data, to first data regarding a first candidate option to be considered for performance of the task, the first data including do-it-yourself (DIY) related data, regarding the user performing the task;
mapping, based on the task data, to second data regarding a second candidate option to be considered for performance of the task, the second data including service provider (SP) related data, regarding an external party performing the task;
generating a first option score, for the first candidate option, based on the profile data and the first data;
generating a second option score, for the second candidate option, based on the profile data and the second data;
performing score processing, including processing the first option score and the second option score, and
the performing score processing including determining that the first option score is favored over the second option score;
saving in the database, based on the determining, recommendation data that the first candidate option is preferred;
mapping, based on the task data, to automation data regarding an automation option to be considered for performance of the task, the automation data including information relating to automated tasks and manual tasks; and generating an automation option score based on the automation data and at least one of the first data and second data, wherein the performing score processing includes processing the automation option score and determining that automation of the task is preferred over manual performance of the task.

16. The user device of claim 15, the user device is one of, a smart phone, and a graphic user interface located on one of a lawn machine and a lawn tool.

17. A method to assess lawncare conditions for an area at a geographical location, implemented on a system including a tangibly embodied computer processor (CP) and a tangibly embodied database, the CP implementing instructions on a non-transitory computer medium disposed in the database, and the database in communication with the CP, the method comprising:

inputting profile data related to a landscape at the area from at least one of a camera, a radar sensor, and a Lidar sensor;

accessing task data regarding a task to be applied to the area;

mapping, based on the task data, to first data regarding a first candidate option to be considered for performance of the task, the first data including DIY (do-it-yourself) related data, regarding the user performing the task;

mapping, based on the task data, to second data regarding a second candidate option to be considered for performance of the task, the second data including service provider (SP) related data, regarding an external party performing the task;

providing information to a user via a user device, the information including at least a set of DIY related information and a set of SP related information, the DIY related information including at least one of DIY cost, DIY product recommendation, DIY ingredient recommendation, and DIY environmental impact information, and the SP related information including at least one of SP cost, SP product recommendation, SP ingredient recommendation, and SP environmental impact information;

generating a first option score, for the first candidate option, based on the profile data and the first data;

generating a second option score, for the second candidate option, based on the profile data and the second data;

performing score processing, including processing the first option score and the second option score, and the performing score processing including determining that the first option score is favored over the second option score;

saving in the database, based on the determining, recommendation data that the first candidate option is preferred;

mapping, based on the task data, to automation data regarding an automation option to be considered for performance of the task, the automation data including information relating to automated tasks and manual tasks; and generating an automation option score based on the automation data and at least one of the first data and second data, wherein the performing score processing includes processing the automation option score and determining that automation of the task is preferred over manual performance of the task.

18. The method of claim 17, further comprising providing a first web link related to DIY goods and services to the user in conjunction with the user selecting a DIY option on the user device, and providing a second web link related to SP goods and services to the user in conjunction with the user selecting an SP option on the user device.

* * * * *